United States Patent
Yamada et al.

(10) Patent No.: US 11,468,572 B2
(45) Date of Patent: Oct. 11, 2022

(54) IMAGE PROCESSING DEVICE, IMAGE RECOGNITION DEVICE, IMAGE PROCESSING PROGRAM, AND IMAGE RECOGNITION PROGRAM

(71) Applicants: AISIN CORPORATION, Kariya (JP); KYUSHU INSTITUTE OF TECHNOLOGY, Kitakyushu (JP)

(72) Inventors: Hideo Yamada, Tokyo (JP); Kazuhiro Kuno, Tokyo (JP); Masatoshi Shibata, Tokyo (JP); Shuichi Enokida, Iizuka (JP); Hiromichi Ohtsuka, Iizuka (JP)

(73) Assignees: AISIN CORPORATION, Kariya (JP); KYUSHU INSTITUTE OF TECHNOLOGY, Kitakyushu (JP)

( * ) Notice: Subject to any disclaimer, the term of this patent is extended or adjusted under 35 U.S.C. 154(b) by 300 days.

(21) Appl. No.: 16/480,989

(22) PCT Filed: Jan. 31, 2018

(86) PCT No.: PCT/JP2018/003225
§ 371 (c)(1),
(2) Date: Jul. 25, 2019

(87) PCT Pub. No.: WO2018/143278
PCT Pub. Date: Aug. 9, 2018

(65) Prior Publication Data
US 2020/0005467 A1    Jan. 2, 2020

(30) Foreign Application Priority Data

Jan. 31, 2017 (JP) .............................. JP2017-016221
Jul. 31, 2017 (JP) .............................. JP2017-148010

(51) Int. Cl.
*G06T 7/143*    (2017.01)
*G06V 10/28*    (2022.01)
(Continued)

(52) U.S. Cl.
CPC .............. *G06T 7/143* (2017.01); *G06V 10/28* (2022.01); *G06V 10/462* (2022.01); *G06V 20/582* (2022.01)

(58) Field of Classification Search
CPC ........ G06T 7/143; G06K 9/38; G06K 9/4671; G06K 9/00818; G06V 10/28;
(Continued)

(56) References Cited

U.S. PATENT DOCUMENTS

| 9,613,258 B2* | 4/2017 | Chen ...................... G06V 40/16 |
| 2010/0002556 A1* | 1/2010 | Miyashita ........ G11B 20/10472 369/53.31 |

(Continued)

FOREIGN PATENT DOCUMENTS

| JP | 2008-257649 A | 10/2008 |
| JP | 2009-301104 A | 12/2009 |

OTHER PUBLICATIONS

Iwata et al., "Object Detection Based on Multiresolution CoHOG," ISVC 2014, Part II, LNCS 8888, 2014, pp. 427-437.
(Continued)

*Primary Examiner* — Qun Shen
(74) *Attorney, Agent, or Firm* — Oliff PLC

(57) ABSTRACT

An image processing device has a function for plotting a luminance gradient co-occurrence pair of an image on a feature plane and applying an EM algorithm to form a GMM. The device learns a pedestrian image and creates a GMM, subsequently learns a background image and creates a GMM, and calculates a difference between the two and generates a GMM for relearning based on the calculation. The device plots a sample that conforms to the GMM for relearning on the feature plane by applying an inverse function theorem. The device forms a GMM that represents the distribution of samples at a designated mixed number
(Continued)

and thereby forms a standard GMM that serves as a standard for image recognition. When this mixed number is set to less than a mixed number designated earlier, the dimensions with which an image is analyzed are reduced, making it possible to reduce calculation costs.

16 Claims, 12 Drawing Sheets

(51) Int. Cl.
*G06V 10/46* (2022.01)
*G06V 20/58* (2022.01)

(58) Field of Classification Search
CPC .... G06V 10/462; G06V 20/582; G06V 10/50; G06V 10/758; G06V 40/10
See application file for complete search history.

(56) References Cited

U.S. PATENT DOCUMENTS

| | | | | |
|---|---|---|---|---|
| 2010/0278357 | A1* | 11/2010 | Hiroe | G10L 21/0272 381/111 |
| 2011/0243376 | A1* | 10/2011 | Luke | G06V 10/255 382/103 |
| 2011/0311137 | A1* | 12/2011 | Liu | G06K 9/4642 382/173 |
| 2013/0287251 | A1* | 10/2013 | Mitsui | G06K 9/3241 382/103 |
| 2016/0078282 | A1* | 3/2016 | Lee | G06K 9/6277 382/118 |
| 2017/0083753 | A1* | 3/2017 | Friedland | G06V 40/171 |
| 2017/0169171 | A1* | 6/2017 | Loeb | G16H 20/40 |
| 2017/0249401 | A1* | 8/2017 | Eckart | G06F 17/18 |

OTHER PUBLICATIONS

Yamauchi et al., "Relational HOG Feature with Wild-Card for Object Detection," 2011 IEEE International Conference on Computer Vision Workshops, 2011, pp. 1785-1792.

Ren et al., "Object Detection Using Generalization and Efficiency Balanced Co-occurrence Features," 2015 IEEE International Conference on Computer Vision, 2015, pp. 46-54.

Aoki et al., "Human Tracking Method based on Improved HOG+ Real AdaBoost," 2015 10th Asian Control Conference (ASCC), IEEE, 2015, pp. 1-6.

Aug. 20, 2020 Extended Search Report issued in European Patent Application No. 18748166.8.

Iwata et al., "Pedestrian detection based on gradient-orientation co-occurrences extracted using different filter sizes," The 21st Symposium on Sensing via Image Information, Jun. 2015, Yokohama, Japan.

Iwata et al., "Object Detection Based on Multiple Resolution CoHOG," The Journal of the Institute of Image Electronics Engineers of Japan, 2016, vol. 45, No. 1, pp. 42-52.

Apr. 24, 2018 International Search Report issued in International Patent Application No. PCT/JP2018/003225.

Aug. 6, 2019 International Preliminary Report on Patentability issued in International Patent Application No. PCT/JP2018/003225.

* cited by examiner

FIG.1(a)
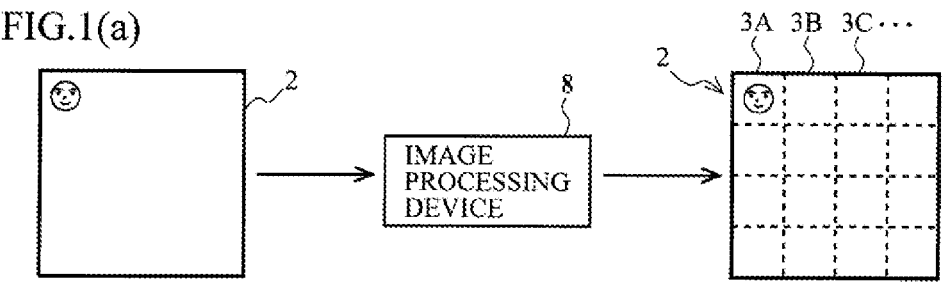
FIG.1(b)
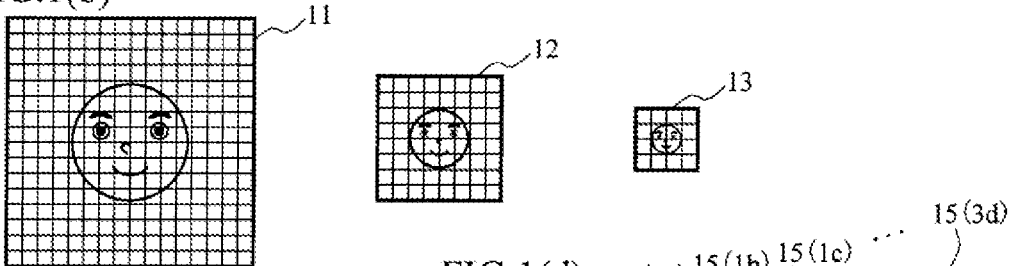
FIG.1(c)
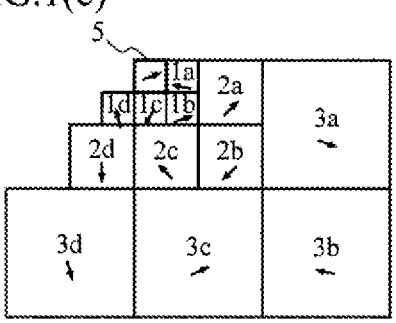
FIG.1(d)
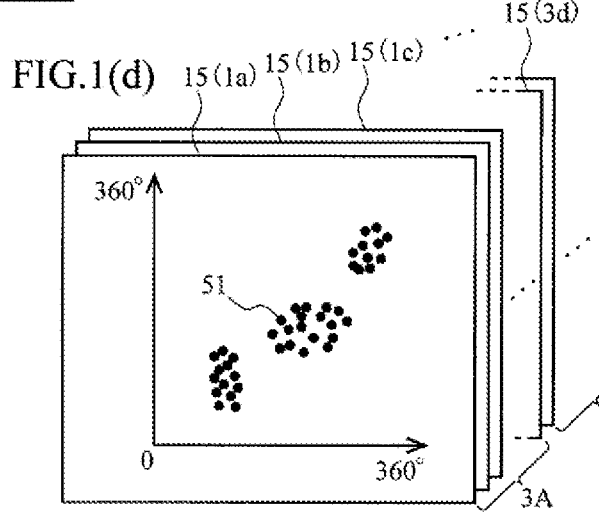
FIG.1(e)
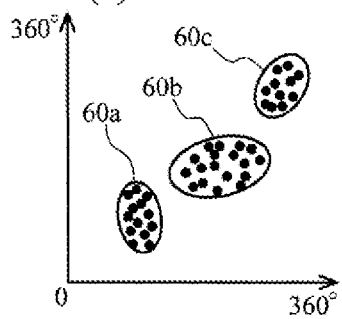
FIG.1(f)
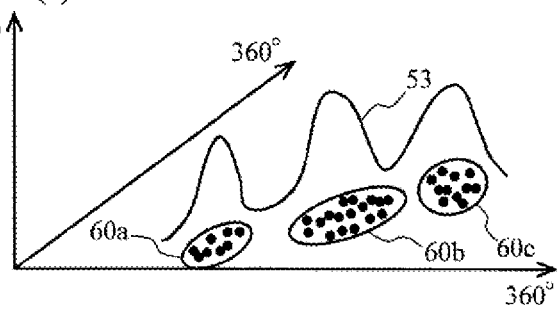
FIG.1(g)
$$p(x|\theta) = \sum_{j=1}^{K} p(x|z=j, \theta) = \sum_{j=1}^{K} \pi_j N(x|\mu_j, \Sigma_j)$$

FIG.4(a)
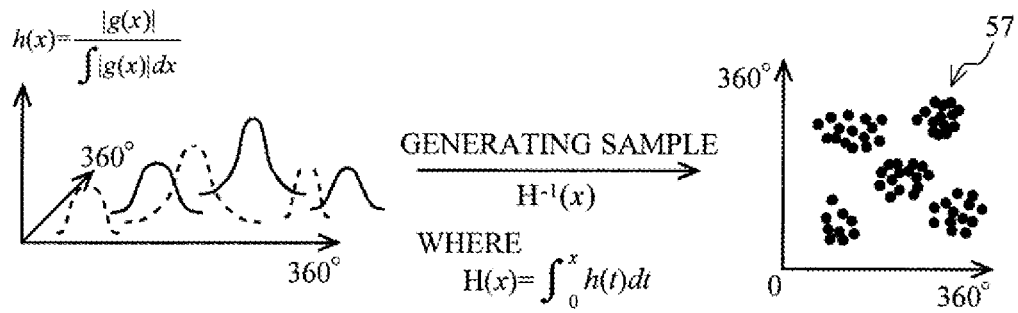
FIG.4(b)
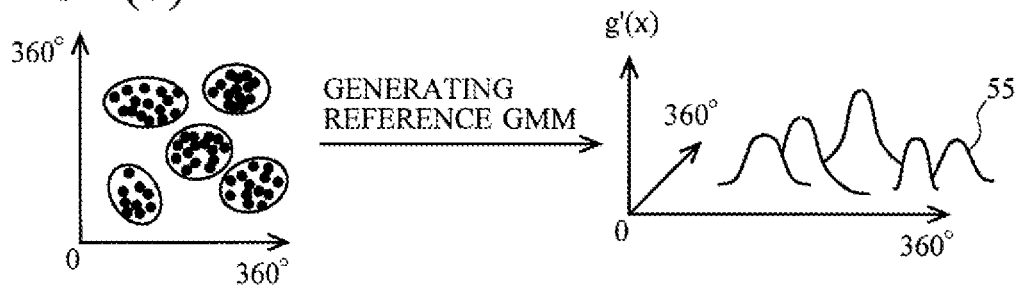
FIG.4(c)
$$\gamma(z_{nk}) = g'(z=k|x_n) = \frac{\pi_k N(x_n | \mu_k \Sigma_k)}{\sum_{j=1}^{K} \pi_j N(x_n | \mu_j \Sigma_j)}$$

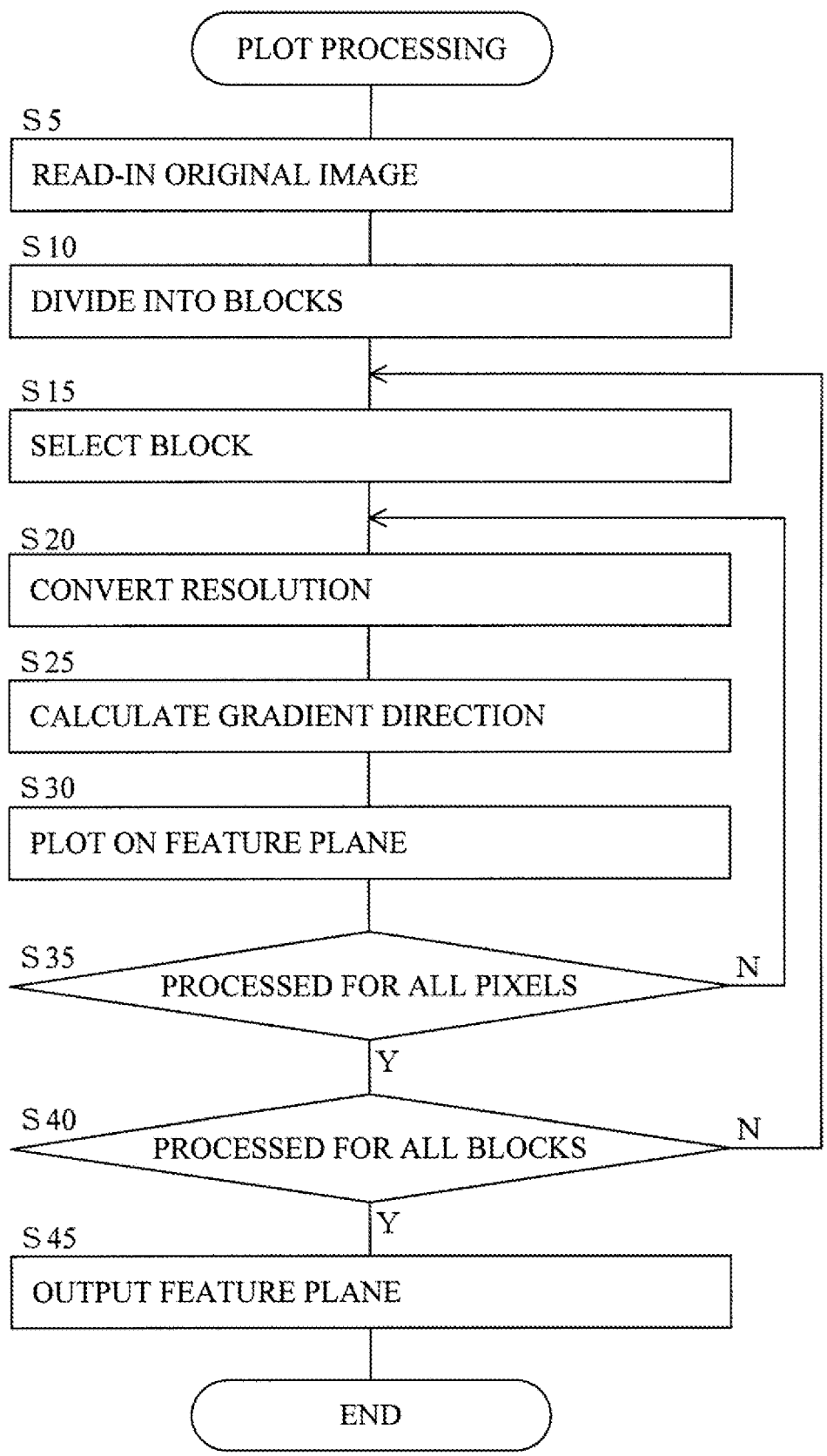

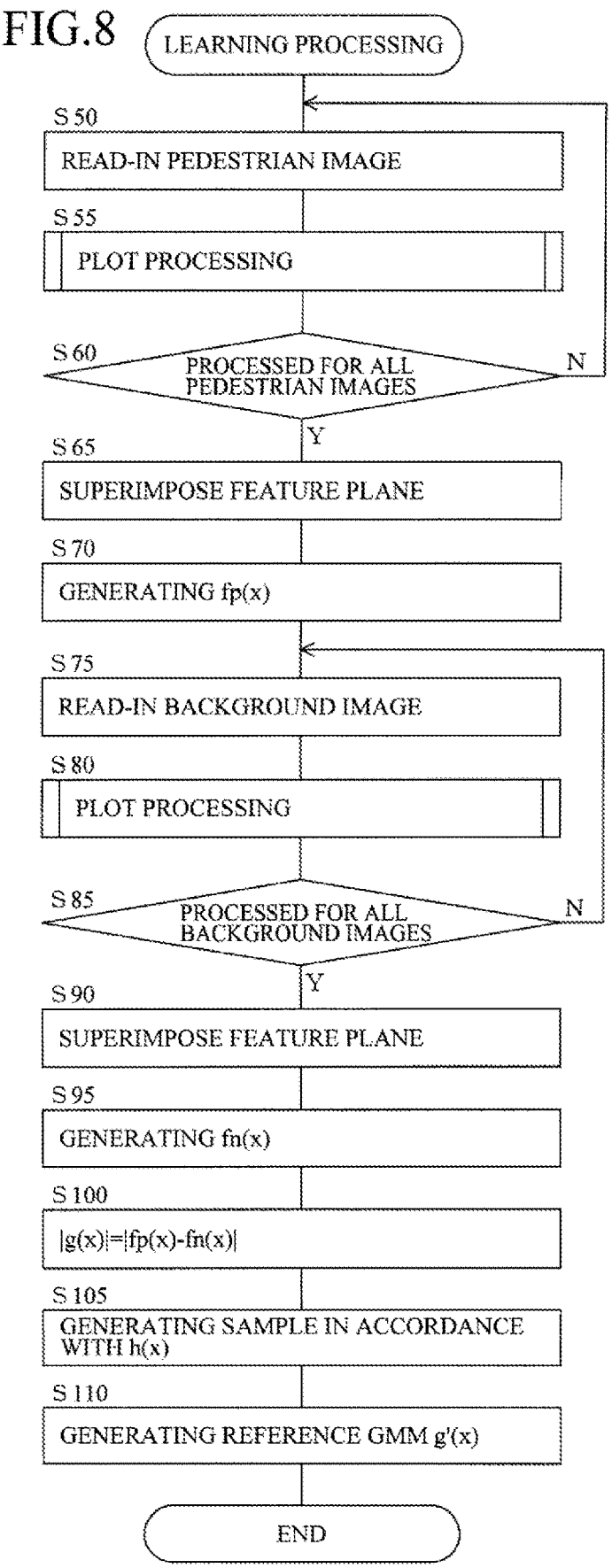

FIG.10(a)
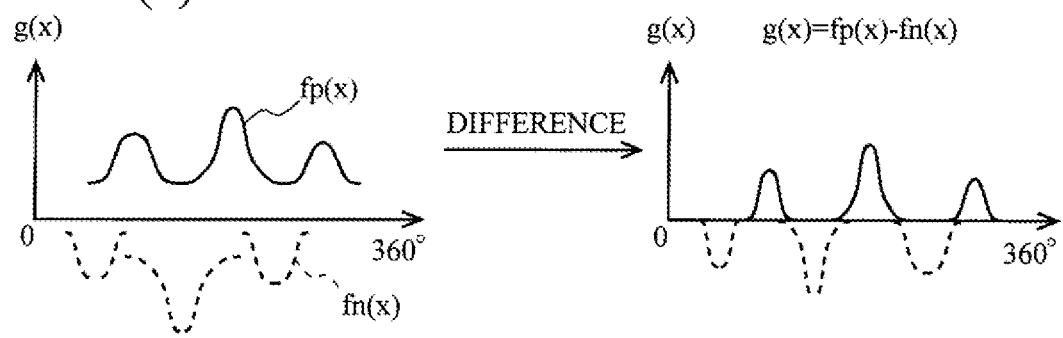
FIG.10(b)
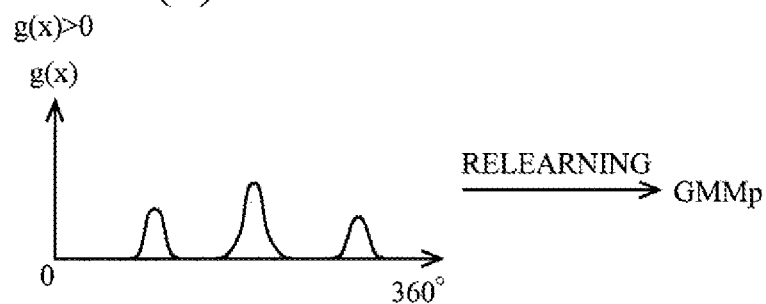
FIG.10(c)
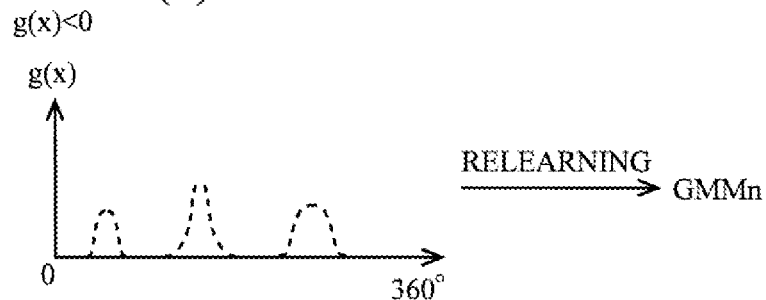
FIG.10(d)
REFERENCE GMM=GMMp+GMMn FIG.11(a)
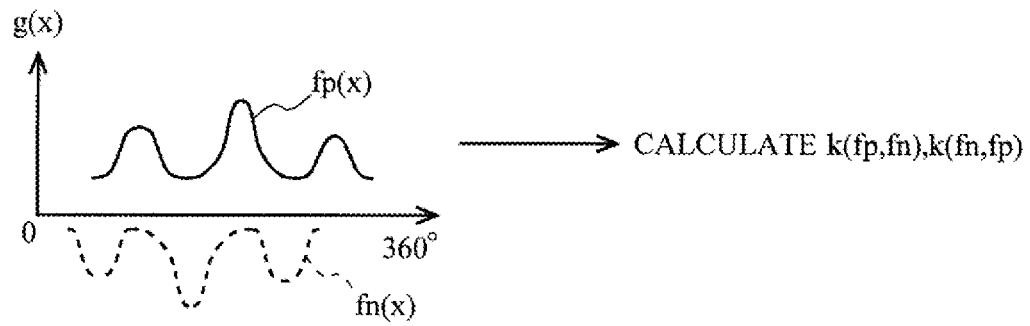
→ CALCULATE k(fp,fn),k(fn,fp)
FIG.11(b)
$$k(fp,fn) = -\int fp(x) \log \frac{fp(x)}{fn(x)} dx$$
IF fp(x)=fn(x) THEN k(fp,fn)=0
FIG.11(c)
IF fp(x)>fn(x) → g(x)=k(fp,fn)
OTHERWISE → g(x)=0
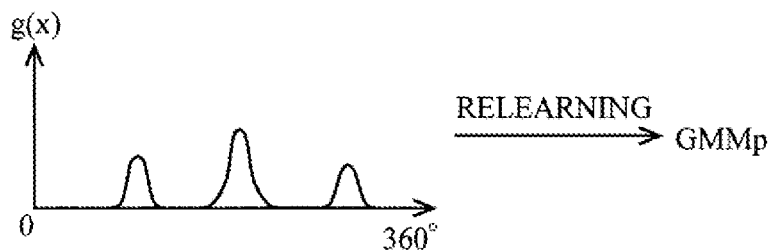
RELEARNING
─────────→ GMMp
FIG.11(d)
IF fn(x)>fp(x) → g(x)=k(fn,fp)
OTHERWISE → g(x)=0
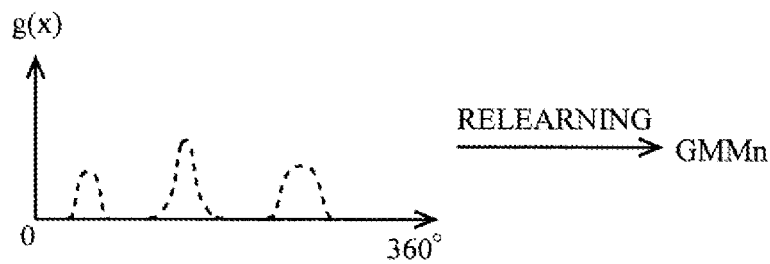
RELEARNING
─────────→ GMMn
FIG.11(e)
REFERENCE GMM=GMMp+GMMn

IMAGE PROCESSING DEVICE, IMAGE RECOGNITION DEVICE, IMAGE PROCESSING PROGRAM, AND IMAGE RECOGNITION PROGRAM

TECHNICAL FIELD

The present invention relates to an image processing device, an image recognition device, an image processing program, and an image recognition program, and for example, relates to each which executes image processing in accordance with a luminance gradient of pixels.

BACKGROUND ART

There has been an image recognition technology for recognizing an object by extracting a distribution in a gradient direction of luminance as image feature amount from an image, and comparing the extracted distribution with a distribution in the gradient direction of luminance of an image which is previously learned.

For example, an "image recognition device" of Patent Literature 1 previously extracts a feature and a feature amount thereof from a standard image. Then, a feature and a feature amount thereof are calculated from an input image, and a feature points similar to the feature amount in the standard image is set as corresponding point.

Subsequently, a reference point is calculated on the basis of the feature amount (including position information etc.) of the feature of the corresponding standard image for each corresponding point (feature point) in the input image, and a vote is given for the input image plane.

Then, when there is a voting value equal to or greater than a predetermined threshold value is in a certain small region, it is determined that an object is present in the input image.

In the prior art, a luminance gradient around a feature point is quantized in 36 directions as a feature amount, and thereby a histogram is created.

However, although an interval of quantization needed to be narrow in order to improve accuracy, there has been a problem that a feature amount became enormous if the interval of quantization is narrow, and a processing time increases.

CITATION LIST

Patent Literatures

Patent Literature 1: Japanese Patent Application Publication No. 2008-257649

DISCLOSURE OF INVENTION

Problem to be Solved by the Invention

The object of the present invention is to improve detection accuracy and also to reduce calculation costs.

SUMMARY OF THE INVENTION(S)

(1) The invention described in claim 1 provides an image processing device comprising: an image input means for inputting an image; a pixel combination acquiring means for acquiring a combination of two pixels from the image which is input; a co-occurrence acquiring means for acquires the co-occurrence in luminance gradient directions of the two pixels related to the acquired combination; an occurrence frequency acquiring means for acquiring distribution of an occurrence frequency of the co-occurrence to be acquired while changing the acquired combination of the pixels; a probability density function generating means for generating a probability density function corresponding the acquired distribution of the occurrence frequency; and a probability density function output means for outputting the generated probability density function in accordance with the parameter for defining the aforementioned probability density function.

(2) The invention described in claim 2 provides the image processing device according to claim 1, further comprising: a recognizing object learning means for inputting a plurality of recognizing object images including a recognizing object from the image input means, and for outputting a recognizing object probability density function based on the plurality of recognizing object images to the probability density function output means; a reference probability density function generating means for generating a reference probability density function which is a reference for executing image recognition of the recognizing object using the recognizing object probability density function which is output; and a reference probability density function output means for outputting the generated reference probability density function in accordance with the parameter for defining the aforementioned reference probability density function.

(3) The invention described in claim 3 provides the image processing device according to claim 2, further comprising: a non-recognizing object learning means for inputting a plurality of non-recognizing object images not including a recognizing object from the image input means, and for outputting a non-recognizing object probability density function according to the non-recognizing object images to the probability density function output means; and a metric information generating means for generating metric information for metricating a correlation between the recognizing object probability density function which is output and the non-recognizing object probability density function which is output, wherein the reference probability density function generating means generates the reference probability density function using the generated metric information.

(4) The invention described in claim 4 provides the image processing device according to claim 3, wherein the metric information generating means generates the metric information in which a metric of the non-recognizing object probability density function with respect to the recognizing object probability density function and a metric of the recognizing object probability density function with respect to the non-recognizing object probability density function have symmetry.

(5) The invention described in claim 5 provides the image processing device according to claim 3 or 4, further comprising a sample generating means for generating a plurality of samples in accordance with the generated metric information, wherein the reference probability density function generating means generates the reference probability density function on the basis of a distribution of an occurrence frequency of the generated sample.

(6) The invention described in claim 6 provides the image processing device according to claim 3, 4, or 5, wherein the recognizing object probability density function and the non-recognizing object probability density function are generated respectively by mixing a predetermined number of basis functions of, and the reference probability density function generating means mixes the number of the basis functions smaller than the predetermined number to generate the reference probability density function.

(7) The invention described in claim 7 provides the image processing device according to any one of claims 1 to 6, further comprising a resolution conversion means for converting a resolution of the input image, wherein the pixel combination acquiring means also makes a pixel of which the resolution is converted an object of the combination.

(8) The invention described in claim 8 provides the image processing device according to claim 3 or 4, wherein the metric information is a differential probability density function using a difference between the recognizing object probability density function and the non-recognizing object probability density function.

(9) The invention described in claim 9 provides the image processing device according to claim 3 or 4, wherein the metric information is a ratio probability density function using a ratio between the recognizing object probability density function and the non-recognizing object probability density function.

(10) The invention described in claim 10 provides the image processing device according to claim 9, wherein the ratio probability density function further uses a difference between the recognizing object probability density function and the non-recognizing object probability density function.

(11) The invention described in claim 11 provides an image recognition device comprising: a reference probability density function acquiring means for acquiring a reference probability density function output from the image processing device according to claim 2; an object image acquiring means for acquiring an object image which is an image recognition object; an object image feature amount acquiring means for acquiring a feature amount of the acquired object image using the acquired reference probability density function; and a determination means for determining whether or not the object image includes the image recognition object using the acquired feature amount.

(12) The invention described in claim 12 provides the image recognition device according to claim 11, wherein the object image feature amount acquiring means inputs the acquired object image into the image input means of the image processing device according to claim 1, and acquires a distribution of an occurrence frequency of co-occurrence in gradient directions in the object image from the occurrence frequency acquiring means of the aforementioned image processing device, and acquires a feature amount of the object image on the basis of a probability that the acquired distribution of the occurrence frequency is generated from the acquired reference probability density function.

(13) The invention described in claim 13 provides an image processing program which uses a computer to realize functions comprising: an image input function for inputting an image; a pixel combination acquiring function for acquiring a combination of two pixels from the image which is input; a co-occurrence acquiring function for acquires the co-occurrence in luminance gradient directions of the two pixels related to the acquired combination; an occurrence frequency acquiring function for acquiring distribution of an occurrence frequency of the co-occurrence to be acquired while changing the acquired combination of the pixels; a probability density function generating function for generating a probability density function corresponding the acquired distribution of the occurrence frequency; and a probability density function output function for outputting the generated probability density function in accordance with the parameter for defining the aforementioned probability density function.

(14) The invention described in claim 14 provides an image recognition program which uses a computer to realize functions comprising: a reference probability density function acquiring function for acquiring the reference probability density function output from the image processing device according to claim 2; an object image acquiring function for acquiring an object image which is an image recognition object; an object image feature amount acquiring function for acquiring a feature amount of the acquired object image using the acquired reference probability density function; and a determination function for determining whether or not the object image includes the image recognition object using the acquired feature amount.

EFFECT OF THE INVENTION(S)

According to the present invention, the detection accuracy can be improve and the calculation costs can also be reduced by making an occurrence frequency of co-occurrence in gradient directions correspond to a probability density function.

BRIEF DESCRIPTION OF DRAWINGS

FIG. 1 are drawings for explaining image processing according to an embodiment.

FIG. 4 are drawings for explaining generation of a reference GMM.

FIG. 7 is a flow chart for explaining a procedure of plot processing.

FIG. 8 is a flow chart for explaining a procedure of the learning processing.

FIG. 10 are drawings for explaining a modified example 1.

FIG. 11 are drawings for explaining a modified example 2.

Figure 2A:
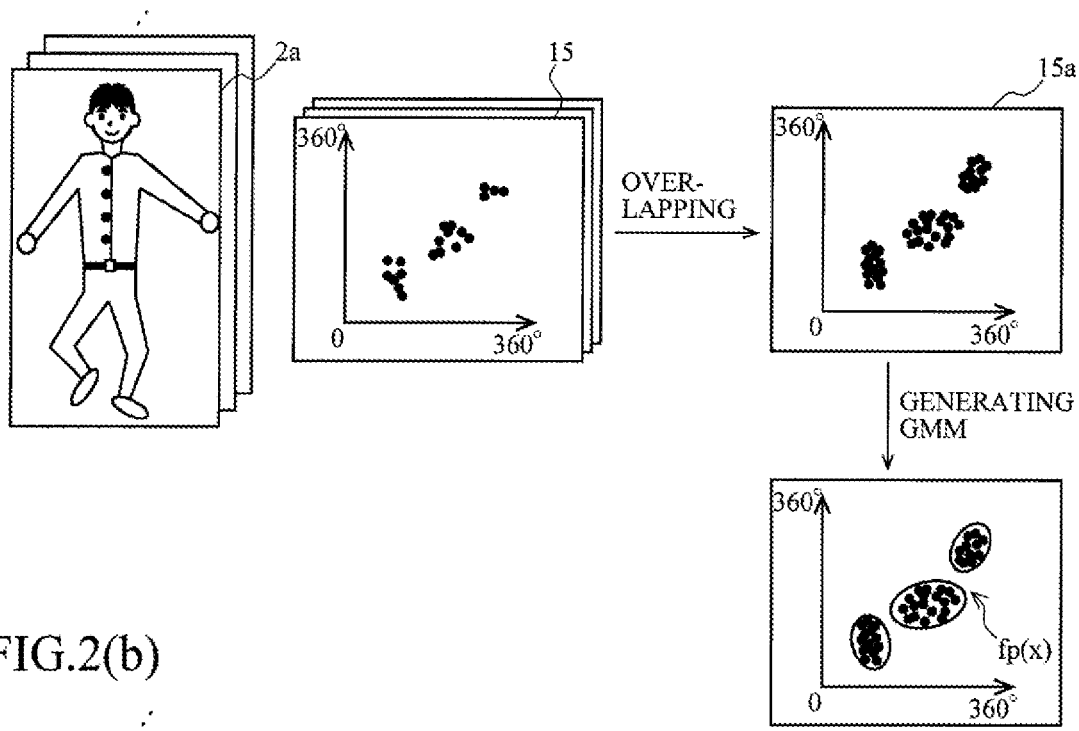
FIG. 2 are drawings for explaining learning processing executed by an image processing device.

BEST MODE(S) FOR CARRYING OUT THE INVENTION (1) Outline of Embodiment

The image processing device 8 prepares a feature plane in which an angle in a luminance gradient direction corresponds to a coordinate value of orthogonal coordinate axes, and plots a luminance gradient co-occurrence pair of an image on the aforementioned feature plane 15. The co-occurrence pair is acquired over between multiple resolutions.

After plotting the co-occurrence pair over the whole image, the image processing device 8 clusters these on the basis of a designated mixed number to form a cluster of the co-occurrence pair.

Then, the image processing device 8 estimates a probable distribution in which the co-occurrence pair occurs by applying an EM algorithm to this and forming a Gaussian Mixture Model (GMM) so that the distribution of the co-occurrence pair in each cluster corresponds to a Gaussian distribution.

The image processing device 8 can set a position and a width of bin of a histogram (distribution of the probability density according to the GMM) as a value suitable for the image instead of a fixed value, in order to dynamically form the GMM on the basis of the distribution of the co-occurrence pair.

The image processing device 8 having the GMM generation function according to the above-mentioned method learns a large number of pedestrian images (a pedestrian is made as an image recognition object) to create a GMM of the pedestrian image, and further learns a large number of background images (image on which no image recognition object is shown) to create a GMM of the background image.

Then, the image processing device 8 calculates a difference between the GMM of the pedestrian image and the GMM of the background image, and forms a GMM for relearning on the basis of this difference therebetween.

Since a portion with which both overlap by the difference can be weakened, only a characteristic portion remains by this, and thereby a distribution which is more suitable for the image recognition can be acquired.

Then, the image processing device 8 plots a sample that conforms to the GMM for relearning on the feature plane 15 by applying an inverse function theorem (i.e., by calculating a cumulative distribution function of the probability density function expressing the GMM for relearning, and the generating an uniform distribution random number following an inverse function of this).

The image processing device 8 finally forms a GMM that represents the distribution of samples at a designated mixed number and thereby forms a standard GMM that serves as a standard for image recognition.

When this mixed number is set to less than a mixed number designated earlier, the number of feature dimensions with which an image is analyzed are reduced, making it possible to reduce calculation costs.

The extent to which the mixed numbers is reduced is determined by a range in which a required image recognition capability can be acquired.

The image processing device 8 calculates a load ratio (contribution percentage) with respect to the reference GMM of the object image which is the image recognition object for each potential parameter, and sets a vector of which the component is the obtained load ratio as a feature amount of the aforementioned object image.

The image processing device 8 inputs the aforementioned feature amount into a discriminator and determines whether or not the pedestrian is included in the aforementioned object image.

As mentioned above, the image processing device 8 calculates distribution of the co-occurrence pair without performing the quantization processing and estimates the probability density function (GMM) corresponding this, instead of the conventional method of quantizing the luminance gradient direction to generate the histogram.

Since the GMM is defined by a parameter expressing a population parameter (average value, variance-covariance matrix, and the like.) etc., it can avoid the problem of increase of the feature amount according to subdivision of the quantization.

(2) Details of Embodiment

FIG. 1 are drawings for explaining image processing according to an embodiment.

The image processing device 8 of the present embodiment: is a device including both of a function as an image processing device configured to extract a feature amount from an image and a function as an image recognition device configured to execute image recognition processing using this extracted feature amount; and is configured to extract the feature amount from the image by observing co-occurrence over between different resolutions of the same image.

As shown in FIG. 1(*a*), the image processing device 8 receives an input of an original image 2 which is an object of image processing, and divides this the original image 2 into a plurality of block regions 3A, 3B, . . . having the same rectangular shape.

In this manner, the image processing device 8 includes an image input means for inputting the images.

In the drawing, it is divided into 4×4 so as to be easily illustrated, but the standard value for dividing is 4×8, for example.

It is to be noted that if it is not necessary to in particular distinguish the block regions 3A, 3B, . . . , they are merely described as the block region 3.

The image processing device 8 divides the original image 2 into the block region 3, converts a resolution of the original image 2, and generates a high-resolution image 11, a medium-resolution image 12, and a low-resolution image 13 respectively having different resolutions (different image sizes), as shown in FIG. 1(*b*). If the resolution of the original image 2 is suitable, the original image 2 is directly used as the high-resolution image.

As mentioned above, the image processing device 8 includes a resolution conversion means for converting the resolution of the image.

In the drawing, the high-resolution image 11, the medium-resolution image 12, and the low-resolution image 13 of the portion of the block region 3A are shown, and grids schematically show the pixels.

Then, the image processing device 8 calculates luminance gradient directions (directions from a low luminance to a high luminance) with respect to the respective pixels of the high-resolution image 11, the medium-resolution image 12, and the low-resolution image 13. The angles of these gradient directions are continuous value within a range from 0 degree to 360 degrees.

Hereinafter, the luminance gradient direction is merely described as a gradient direction.

When calculating the gradient direction in this manner, the image processing device 8 acquires co-occurrence in the gradient directions of a reference pixel (hereinafter, pixel of interest) and a pixel (hereinafter, offset pixel) located away from this, as follows.

First, as shown in FIG. 1(*c*), the image processing device 8 sets a pixel of interest 5 to the high-resolution image 11, and attention is focused on offset pixels 1*a* to 1*d* which are at an offset distance 1 from the pixel of interest 5 in the high-resolution image 11 (i.e., adjacent to in high resolution).

It is to be noted that the distance of n pixels is referred to as an offset distance n.

Then, the image processing device 8 acquires co-occurrence (gradient directions should put together) in each gradient directions between the pixel of interest 5 and the offset pixels 1*a* to 3*d*, and plots points corresponding thereto as the co-occurrence corresponding points 51, 51, . . . on feature planes 15 (1*a*) to 15 (3*d*) shown in FIG. 1(*d*).

It is to be noted that the 12 feature planes 15 (1*a*) to 15 (3*d*) shown in FIG. 1(*d*) are created for each of the block regions 3A, 3B, . . . which are divided in FIG. 1(*a*).

Hereinafter, when referring to a plurality of whole feature planes, it is referred to as a feature plane 15.

For example, in FIG. 1(c), when the co-occurrence between the pixel of interest 5 and the offset pixel 1a is plotted, if the gradient direction of the pixel of interest 5 is 26 degrees and the gradient direction of the offset pixel 1a is 135 degrees, the image processing device 8 plots the co-occurrence corresponding point 51 a position where the axis of abscissa of the feature plane 15 (1a) for the offset pixels 1a is 26 degrees and the axis of ordinate thereof is 135 degrees.

Then, the image processing device 8 takes co-occurrence between the pixel of interest 5 and the offset pixel 1a and a vote is given to the feature plane 15 (1a), while moving the pixel of interest 5 one after another, in the high-resolution image 11.

In this manner, the feature plane 15 expresses what frequency of occurrence of two gradient direction pairs having a specific offset (relative position from the pixel of interest 5) in the image.

In addition, the reason for observing the co-occurrence for the pixel on the right side of the pixel of interest 5 toward the drawing in FIG. 1(c) is to prevent acquisition of a combination of co-occurrence that overlaps with the movement of the pixel of interest, since it is set as a moving route of first moving the pixel of interest 5 from the pixel at an upper left end to the pixel in a right direction sequentially toward the drawing and moving it to the right from the pixel at a left end which is lower by one line when reaching the right end.

Moreover, although the movement of the pixel of interest 5 is executed in the block region 3A (inside of the same block region), the selection of the offset pixel is executed even when exceeding the block region 3A.

At the end portion of the original image 2, although the gradient direction cannot be calculated, this is processed by any appropriate method.

Then, the image processing device 8 acquires the co-occurrence in the gradient direction between the pixel of interest 5 and the offset pixel 1b (refer to FIG. 1(c)), and plots the co-occurrence corresponding point 51 corresponding thereto on the feature plane 15 (1b).

The image processing device 8 prepares new feature plane 15 which is different from the feature plane 15 (1a) previously used for the pixel of interest 5 and the offset pixel 1a, and a vote is given to this. In this manner, the image processing device 8 generates the feature plane 15 for every combination of the relative positional relationships between the pixel of interest 5 and the offset pixel.

Then, the image processing device 8 takes co-occurrence between the pixel of interest 5 and the offset pixel 1b and plots the co-occurrence corresponding point 51 on the aforementioned feature plane 15 (1b), while moving the pixel of interest 5 one after another, in the high-resolution image 11.

Hereinafter similarly, the image processing device 8 prepares individual feature planes 15 (1c) and 15 (1d) respectively for a combination between the pixel of interest 5 and the offset pixel 1c and a combination between the pixel of interest 5 and the offset pixel 1d, and plots the co-occurrence in the gradient directions thereon.

In this manner, the image processing device 8 generates the four feature planes 15 with respect to the pixel of interest 5 and the offset pixels 1a to 1d at the offset distance 1 from the pixel of interest 5, and then attention is focused on the pixel of interest 5 in the high-resolution image 11 and offset pixels 2a to 2d in the medium-resolution image 12 at the offset distance 2.

Then, the feature plane 15 (2a) according to the combination of the pixel of interest 5 and the offset pixel 2a is created, and the feature planes 15 (2b) to 15 (2d) according to the combination of the offset pixels 2b 2c, and 2d are created by the same method, as the above-mentioned method.

Then, the image processing device 8 generates the feature planes 15 (3a) to 15 (3d) for respective combinations of relative positional relationships between the pixel of interest 5 and the offset pixels 3a to 3d, with respect of the pixel of interest 5 in the high-resolution image 11 and the offset pixels 3a to 3d of the low-resolution image 13 at the offset distance 3, in the same manner.

The image processing device 8 applied the above-mentioned processing also to the block regions 3B, 3C, . . . , and generates a plurality of feature planes 15 obtained by extracting a feature of the original image 2.

In this manner, the image processing devices 8 generates a plurality of the feature planes 15 (1a) to 15 (3d) respectively for the block regions 3A, 3B, 3C . . . .

In this way, the image processing device 8 includes a pixel combination acquiring means for acquires the combination of the two pixels from the input image, and a co-occurrence acquiring means for acquires the co-occurrence in the luminance gradient directions of the two pixels related to the combination, and the aforementioned pixel combination acquiring means also makes the pixel of which the resolution is converted the object of the combination.

Moreover, the image processing device 8 includes an occurrence frequency acquiring means for acquiring a distribution of the occurrence frequency of the co-occurrence in accordance with a scatter diagram according to the feature plane 15, while changing the combination of the pixels to be acquired, and thereby an occurrence in the gradient direction pair is mapped in an co-occurrence feature space expressed by the feature plane 15.

The image processing device 8 includes a feature plane generating function for generating a plurality of the feature planes 15 for each offset pixel for each block region 3 from the original image 2, in this manner.

Then, the image processing device 8 generates the Gaussian Mixture Model (GMM) as follows, with regard to each of these feature planes 15.

Here, in order to easily explain, the GMM is generated from the feature plane 15 created from the original image 2, but more in details, the GMM is generated with respect to an overlap with the feature plane 15 acquired from a large number of learning images, as mention below.

FIG. 1(e) shows one of the plurality of the feature planes 15, and the image processing device 8 firstly clusters them to a cluster (group) of which the mixed number is K by combining close co-occurrence corresponding points 51 with each other. The mixed number indicates the number of the Gaussian distribution to be mixed when generating the GMM, and when the mixed number is suitably designated, the image processing device 8 automatically clusters the co-occurrence corresponding point 51 to the designated number of clusters.

In the present embodiment, it is set as K=64, as an example. In the drawing, for the sake of simplicity, it is set as K=3, and the co-occurrence corresponding points 51 are clustered into clusters 60a to 60c.

The co-occurrence corresponding points 51, 51, . . . plotted on the feature plane 15 have a tendency to get together in accordance with the feature of the image, and the clusters 60a, 60b, . . . reflect the feature of the image.

Since the feature dimension in the image recognition depends on the mixed number K, it is one of the important matters how far the mixed number K can be reduced without degrading the feature of the image.

After the image processing device 8 clusters the co-occurrence corresponding point 51, a probability density function 53 of the co-occurrence corresponding point 51 in the feature plane 15 is expressed by the probability density function p(x|θ) in accordance with the GMM 53 linearly overlapping K Gaussian distributions as shown in FIG. 1(f). In this way, the Gaussian distribution is used as a basis function, and the probability density function 53 expressed by a linear sum according thereto is GMM.

It is to be noted that p(x|θ) is abbreviated as p(x), in the axis of ordinate of FIG. 1(f). Moreover, hereinafter, the probability density function is abbreviated as p(x) unless it is particularly necessary.

The GMM functions as a probability density function expressing a probability that the co-occurrence corresponding points are distributed, and the image processing device 8 includes a probability density function generating means for generating the probability density function corresponding to the distribution of the occurrence frequency of the co-occurrence in the gradient directions in accordance with the GMM.

A specific equation of the probability density function p(x|θ) is expressed as shown in FIG. 1(g).

Here, x is a vector quantity expressing the distribution of the co-occurrence corresponding points 51, and θ is a vector quantity expressing a population parameter (μj, Σj) (where, j=1, 2, . . . , K).

πj is called a mixture coefficient and indicates a probability for selecting the j-th Gaussian distribution. μj and Σj respectively indicate an average value of j-th Gaussian distribution and a variance-covariance matrix. The probability density function 53, i.e., GMM, is uniquely determined by πj and θ.

Z is a potential parameter used for calculating an EM algorithm and load ratio γ, and z1, z2, . . . , zK are used in correspondence with the K Gaussian distributions to be mixed.

Although explanation is omitted, the EM algorithm is an algorithm for estimating πj and the parameter (μj, Σj) for maximizing likelihood, the image processing device 8 determines πj and θ by applying the EM algorithm thereto, and thereby calculating (estimating) the p(x|θ).

πj and θ function as a parameter for defining the probability density function 53, and the image processing device 8 includes a probability density function output means for outputting a probability density function output from the parameter for defining the aforementioned probability density function.

Since the image processing device 8 expresses the distribution in the gradient directions with the GMM instead of the co-occurrence histogram according to the quantized gradient directions, the distribution in the gradient directions pair can be expressed by these parameters, and thereby an increase of the amount of information accompanied with the subdivision of the quantization can be avoided.

FIG. 2 are drawings for explaining learning processing executed by the image processing device 8.

In the present embodiment, a pedestrian is used as an image recognition object as an example. Accordingly, in order to learn the pedestrian's feature, a large number (e.g., ten thousand sheets) of original images 2a, 2a, . . . composing a pedestrian images on which the pedestrian is shown in various aspects, and a large number (e.g., ten thousand sheets) of original images 2b, 2b, . . . composing background images corresponding to a pedestrian's background are prepared as learning images.

It is to be noted that since the image processing device 8 also learns the background images in addition to the pedestrian images, the image processing device 8 can deduct points that are probably not to be pedestrians in the image recognition processing, thereby improving accuracy. This is merely an example, and the image processing can also be executed only with the pedestrian images.

First, as shown in FIG. 2(a), the image processing device 8 reads an original image 2a composed of a pedestrian image, divides this image into a block region 3 (not shown), and generates a feature plane 15 for each offset pixel with regard to each block region 3.

In this manner, the image processing device 8 generates the feature plane 15 for each offset pixel with regard to each original image 2a, 2a, . . . for each block region 3, and then generates a feature plane 15a in which corresponding feature planes 15 (i.e., feature planes 15 of the same offset pixel in the same block region 3) are overlapped with one another for each block region 3 and for each offset pixel.

A feature common to the pedestrian's image is included in the feature plane 15a by the distribution of the co-occurrence corresponding point, and the image processing device 8 clusters the co-occurrence corresponding point of the feature plane 15a and generates a positive GMM composed of the probability density function fp(x).

Here, p means that the detection object (in this case, the pedestrian who is the image recognition object) is shown thereon, and corresponds to "p" of the "positive". Such an image on which the image recognition object is shown is also referred to as a positive image.

As mentioned above, the image processing device 8 includes a recognizing object learning means for inputting a plurality of the recognizing object images including the recognizing object from the input means, and outputting the recognizing object probability density function (fp(x)) on the basis of the plurality of the aforementioned recognizing object images to the output means.

Figure 2B:
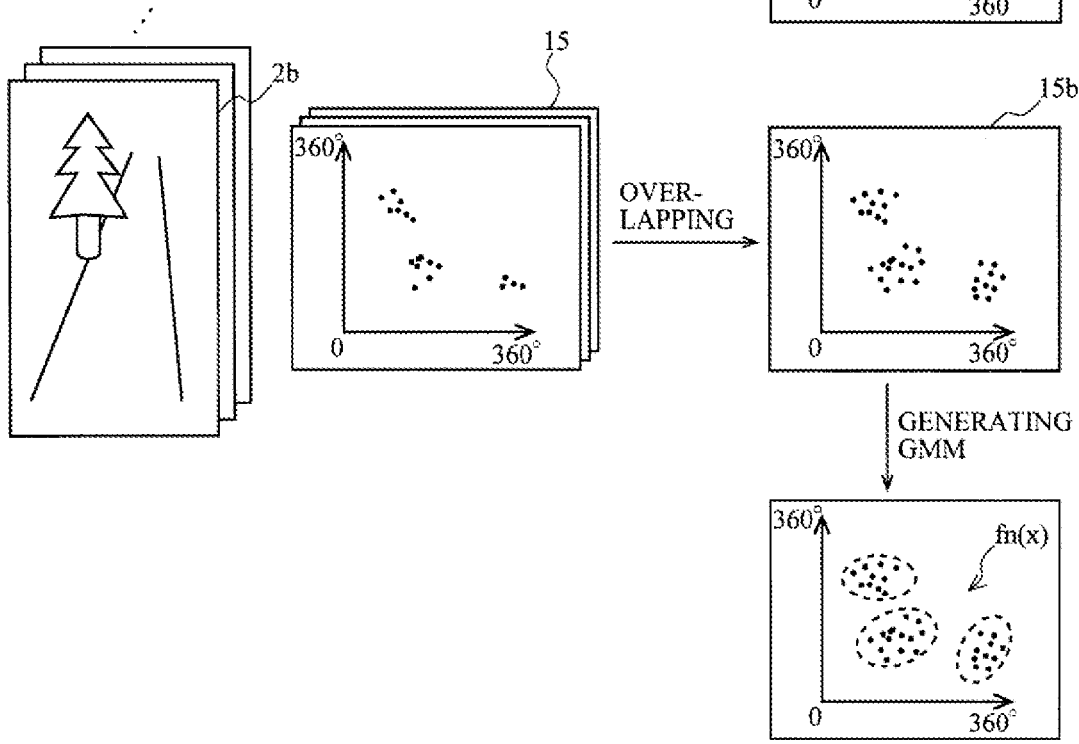

Then, as shown in FIG. 2(b), the image processing device 8 reads an original image 2b composed of a background image, divides this image into a block region 3 (not shown), and generates a feature plane 15 for each offset pixel with regard to each block region 3.

In this manner, the image processing device 8 generates the feature plane 15 for each offset pixel with regard to each original image 2b, 2b, . . . for each block region 3, and then generates a feature plane 15b in which the corresponding feature planes 15 are overlapped with one another for each block region 3 and for each offset pixel.

A feature common to the background in which no pedestrian exists is included in the feature plane 15b by the distribution of the co-occurrence corresponding point, and the image processing device 8 clusters the co-occurrence corresponding point of the feature plane 15b and generates a negative GMM composed of the probability density function fn(x).

Here, n means that the detection object (in this case, the pedestrian who is the image recognition object) is not shown thereon, and corresponds to "n" of the "negative". Such an image on which the image recognition object is not shown is also referred to as a negative image.

As mentioned above, the image processing device 8 includes a non-recognizing object learning means for inputting a plurality of the non-recognizing object images including no recognizing object from the input means, and outputting the non-recognizing object probability density function (fn(x)) on the basis of the plurality of the aforementioned non-recognizing object images to the output means.

As mentioned above, the image processing device 8 extracts the feature amount of the pedestrian image in accordance with fp(x) and extracts the feature amount of the background image in accordance with fn(x).

fp(x) obtained in the above mentioned manner is a function with which the basis function is arranged in a region where the probability that the pedestrian is present is high, and can be utilized as a determination criterion when recognizing the pedestrian shown on the image.

On the other hand, fn(x) can be considered that the basis function is arranged on the background, i.e., a region which is not the pedestrians, and is considered to be a function reflecting the feature of not the pedestrian. When a background is actually captured from a car window, probably because there are many vertical edge parts of the building structure a distribution different from that of the pedestrian is acquired.

Therefore, it is possible to use only the fp(x) as a pedestrian identification reference, but in consideration that the fn(x) is also used collectively for portions that are not the pedestrian, it is considered that a characteristic reference for better identifying the pedestrian and non-pedestrian more can be acquired.

Accordingly, in the present embodiment, a correlation between fp(x) and fn(x) is metricated to define the pedestrian's feature amount using this reference.

Here, the correlation between fp(x) and fn(x) means a strength of relationship between the both, a scale for measuring a degree of the strength of the relationship therebetween is a metric.

In other words, a matric space where fp(x) and fn(x) are arranged is defined by the metric, and the strength of the correlation between the both is determined in accordance with the distance (i.e., metric) between the both in the aforementioned matric space.

A mathematical expression expressing the metric can be defined in various definitions, for example, metrics preferable expressing the pedestrian's feature, e.g. a metric using a difference between the both, a metric using both ratio, or a metric using the difference and the ratio between the both, can be adopted thereinto.

Here, the correlation between fp(x) and fn(x) is metricated in accordance with the difference between fp(x) and fn(x), as an example.

As mentioned above, the image processing device 8 creates the co-occurrence distribution on the basis of the metric of the correlation between the feature amount of the recognizing object image (recognizing object probability density function) (fp(x)) and the feature amount of the non-recognizing object image (non-recognizing object probability density function) (fn(x)), when learning of the co-occurrence distribution.

At this time, since the co-occurrence distribution is generated on the basis of the probability density distribution, a reference in consideration of the difference in the amount of information included in the probability density distribution can be acquired.

Figure 3A:
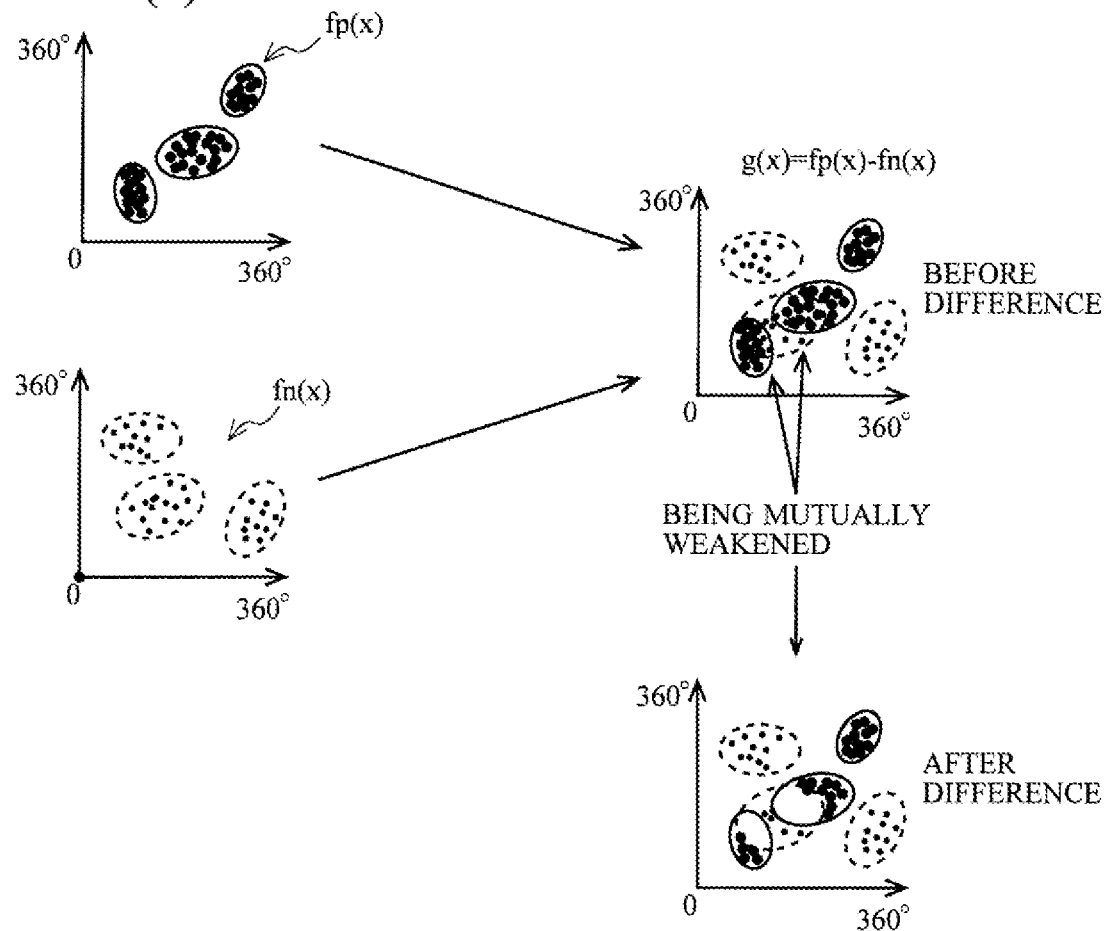
FIG. 3 are drawings for explaining difference processing between fp(x) and fn(x).
Figure 3B:
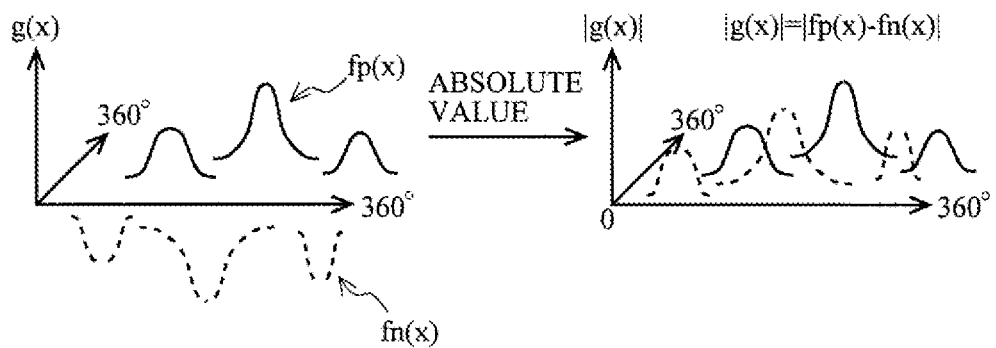

FIG. 3 are drawings for explaining difference processing for the metric of the correlation between fp(x) and fn(x) on the basis of the difference therebetween.

Although fp(x) expresses a feature according to the distribution of the co-occurrence corresponding points of the pedestrian image and fn(x) expresses a feature according to the distribution of the co-occurrence corresponding points of the background image, both feature may be overlapped with each other.

In this overlapping portion, since it is not clear whether the feature amount extracted from the image recognition object image corresponds to the pedestrian or the background, the explanatory power that the aforementioned feature amount is the pedestrian is weakened in accordance with a degree of the overlapping.

Accordingly, in the present embodiment, as shown in FIG. 3(*a*), the difference between the both is taken as g(x)=fp(x)−fn(x).

Accordingly, as shown in the schematic diagram of the feature planes before and after the difference in FIG. 3(*a*), the feature common to both the pedestrian image and the background image is mutually weakened in accordance with a degree thereof, and thereby a characteristic portion for both remains.

For example, if a value of the pedestrian image side of a certain overlapped portion is 0.6, and a value of the background image side is 0.2, this overlapped portion has an explanatory power by 0.6−0.2=0.4 as a pedestrian's feature amount by the difference therebetween. If the value of the pedestrian image side is 0.4, and the value of the background image side is 0.4, this portion has no explanatory power, i.e., 0, as a pedestrian's feature amount or background's feature amount.

Furthermore, the image processing device 8 generates a reference GMM used for the image recognition processing from the probability density function |g(x)| defined by an absolute value |g(x)|=|fp(x)−fn(x)| of the difference, as shown in FIG. 3(*b*).

By taking the absolute value of the difference, it is possible to acquire an important feature which appears in the positive image and does not appear in the negative image, appears in the positive image and appears in the negative image, and thereby detection accuracy can be improved.

As mentioned above, the image processing device 8 includes a metric information generating means for generating the output recognizing object probability density function (fp(x)), the non-recognizing object probability density function (fn(x)), and the metric information (which is information acquired by the metric and is differential probability density function (|g(x)|) in this case) for the metric of the correlation.

Moreover, the metric information shown in this example is a differential probability density function using a difference between the recognizing object probability density function and the non-recognizing object probability density function.

It is to be noted that in the present embodiment, although the difference between fp(x) and fn(x) is simply calculated, the metric information may be calculated using a KL feature amount or a JS feature amount which will be explained in below-mentioned modified examples.

FIG. 4 are drawings for explaining generation of the reference GMM.

Although differential probability density function |g(x)| can also be used as it is, the image processing device 8 relearns h(x)=|g(x)|/∫|g(x)|dx obtained by normalizing this to generate the reference GMM, as shown in FIG. 4(*a*).

When h(x) is generated, the image processing device 8 generates a large number of samples according to this using an inverse function rule, and plots these samples on the feature plane.

More specifically, the image processing device 8 generates a cumulative distribution function $H(x)=\int h(t)dt$ (integration is from t=0 to t=x) of h(x), and generates uniform distribution random numbers in accordance with the inverse function H−1(x) (−1 is a superscript) of this h(x). Consequently, the image processing device 8 acquires the distribution 57 of the samples according to h(x).

As mentioned above, the image processing device 8 includes a sample generating means for generating a plurality of the samples in accordance with the metric information (in this case, differential probability density function).

Then, the image processing device 8 generates a reference GMM 55 expressing the reference probability density function g'(x) by clustering the samples generated in accordance with h(x), as shown in FIG. 4(*b*).

The image processing device 8 obtains and outputs parameters (mixture coefficients πj, population parameter θ, and the like) for defining the reference GMM 55 in accordance with the EM algorithm.

As mentioned above, the image processing device 8 includes: a reference probability density function generating means for generating a reference probability density function which is a reference of the image recognition of the recognizing object on the basis of the distribution of the occurrence frequency of the samples, from the differential probability density function; and a reference probability density function output means for outputting the generated reference probability density function in accordance with the parameters (θ etc.) for defining the aforementioned reference probability density function.

In the present embodiment, it is confirmed by an experiment that an image recognition ability to be required can be secured even when the mixture coefficients at the time of generating the reference GMM 55 is K=32, and it succeeds in reducing the mixed number by half from the mixture coefficients K=64 set for learning.

In this manner, the recognizing object probability density function (fp(x)) and the non-recognizing object probability density function (fn(x)) are generated respectively by mixing a predetermined number of the basis functions (Gaussian distribution), and the reference the probability density function generating means mixes the number of the basis functions smaller than the predetermined number (K=64) to generate the reference probability density function.

Since the dimension of the feature amount of the image recognition object image corresponds to the mixed number× the number of offset pixels×the number of resolutions×the number of block regions, as mentioned below, when the mixed number is reduced, the dimension of the feature amount can also be reduced, and thereby it can reduce a load required for the image processing.

Furthermore, the image processing device 8 includes a reference probability density function generating means for generating a reference probability density function which is a reference for the image recognition of the recognizing object using the recognizing object probability density function (fp(x)), and the aforementioned reference probability density function generating means generates a reference probability density function using the differential probability density function generated on the basis of fp(x) and fn(x).

The image processing device 8 calculates a feature amount of the image recognition object image using a load ratio γ shown in the expression of FIG. 4(*c*), using the reference GMM 55 generated in this manner. Here, x indicates a distribution of the co-occurrence corresponding point 51 of the luminance gradient in the object image.

The load ratio γ(nk) expresses a probability that a certain co-occurrence corresponding point xn is generated from the k-th Gaussian distribution.

The image processing device 8 normalizes load ratio γ by means of, for example a normalization method, e.g. L2 normalization or power normalization, to be a feature amount for the image recognition processings.

Then, the image processing device 8 inputs the normalized feature amount into a discriminator, e.g. Support Vector Machine (SVM) or AdaBoost, for example, and determines the image recognition.

It is to be noted that this does not limit the discriminator and a user can freely select it from the balance of calculation cost or accuracy.

As mentioned above, the image processing device 8 includes a reference probability density function acquiring means for acquiring the reference probability density function, and an object image acquiring means for acquiring the object image which is the image recognition object for the image recognition.

Moreover, the image processing device 8 includes: in order to take the co-occurrence in the gradient directions from the object image using the function used by the learning and to obtain the load ratio, an object image feature amount acquiring means for acquiring the distribution of the occurrence frequency of the co-occurrence in the gradient directions in the object image, and acquiring the feature amount of the object image on the basis of the probability (i.e., load ratio) that the distribution of the aforementioned occurrence frequency is generated from the reference probability density function; and a determination means for determining whether or not the object image includes the image recognition object using the aforementioned feature amount.

Figure 5:
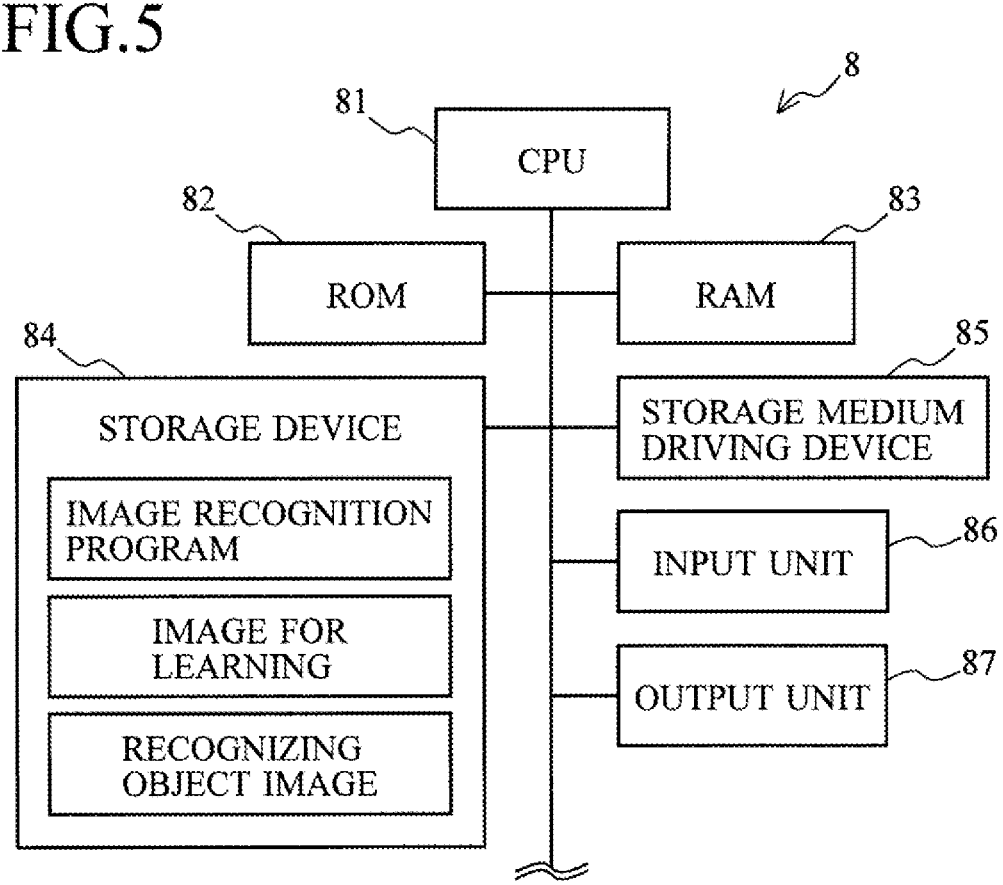
FIG. 5 is a drawing showing an example of a hardware configuration of the image processing device.

FIG. 5 is a drawing showing an example of a hardware configuration of the image processing device 8.

The image processing device 8 is configured to include a personal computer, for example.

This is merely an example, and dedicated hardware for extracting the feature amount formed of a semiconductor device may be mounted in an in-vehicle camera or the like.

The image processing device 8 is configures by connecting a CPU 81, a ROM 82, a RAM 83, a storage device 84, a storage medium driving device 85, an input unit 86, an output unit 87, and the like through a bus line.

The CPU 81 is a central processing unit, operates in accordance with an image recognition program stored in the storage device 85, and executes the above-mentioned feature amount extracting processing from the image, the above-mentioned image recognition processing using the extracted feature amount, and the like.

The ROM 82 is a read-only memory and stores a basic program and parameters for operating the CPU 81.

The RAM 83 is a memory capable of reading and writing and provides a working memory at the time when the CPU 81 executes the feature amount extracting processing and the image recognition processing.

The storage device 84 is configured using a large-capacity storage medium, e.g. a hard disk, and is configured to store an image recognition program, images for learning, image data of recognizing object images, and the like.

The image recognition program is a program that causes the CPU 81 to exhibit the image processing function and the image recognition processing function.

The storage medium driving device 85 is a device for driving external storage media, e.g. a semiconductor memory device and a hard disk, for example.

Consequently, the image for learning and the recognizing object image can be read.

The input unit 86 includes input devices for receiving an input from an operator, e.g. a keyboard and a mouse, and is configured to read various kinds of programs and data and to receive an operation from the operator.

The output unit 87 includes output devices for presenting various information, e.g. a display and a printer, to the operator, and is configured to output an operation screen for the image recognition program and results of the feature amount extracting processing and the image recognition processing.

In addition, the image processing device 8 includes a communication control unit for being connected to a communication network and an interface for connecting an external device, and the like.

It is possible to receive moving images from a camera connected to the communication network or the interface, and to execute the image recognition processing in real time with respect to the receives moving images.

FIG. 6 show graphic charts expressing results of a quantitative evaluation experiment in which an image recognition is executed by means of a method of using the above-mentioned reference GMM.

Figure 6A:
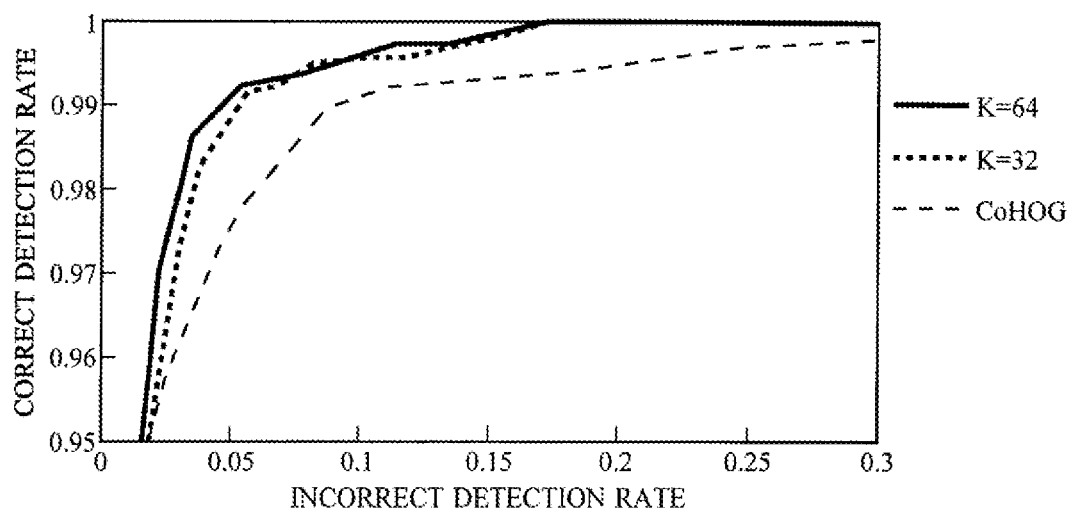
FIG. 6 show graphic charts expressing results of a quantitative evaluation experiment in which an image recognition is executed by means of a method of using the reference GMM.

FIG. 6(a) shows an experimental result in the case of changing the mixed number of the reference GMM.

The drawing shows a comparison between a case where the reference GMM is generated with the mixed number K=64, and a case where the reference GMM is generated with the mixed number K=32, and a case where the reference GMM is generated using Co-occurrence HOG (CoHOG).

In this graphic chart, the axis of ordinate is a correct detection rate, and the axis of abscissa is an incorrect detection rate, and it is evaluated that the larger the area under the curve showing the experimental data, the higher the performance.

The CoHOG is a feature amount that focuses on a gradient pair between two pixels in a local region in the same resolution, and is a method that has been evaluated to be highly robust. In the CoHOG, the luminance gradient direction is quantized for example, in eight directions, and the co-occurrence histogram for each gradient pair is used as the feature amount of the image.

Since the image processing device 8 observes the co-occurrence with regard to a pixel adjacent to the pixel of interest 5 in the high-resolution image 11, a pixel adjacent to the pixel of interest 5 in the medium-resolution image 12, and a pixel adjacent to the pixel of interest 5 in the low-resolution image 13, the focus is on the gradient pair between two pixels in the local region at the multiplex resolution.

As shown in the graphic chart, when setting as K=64 or K=32, the performance is superiorly higher than that of the CoHOG, and when K=32, the accuracy slightly lower than that of slightly lower than that of the case of K=64, but both have the almost same accuracy, and therefore it proves that it sufficiently withstands to practical use even if the feature dimension according to K is reduced by half.

Figure 6B:
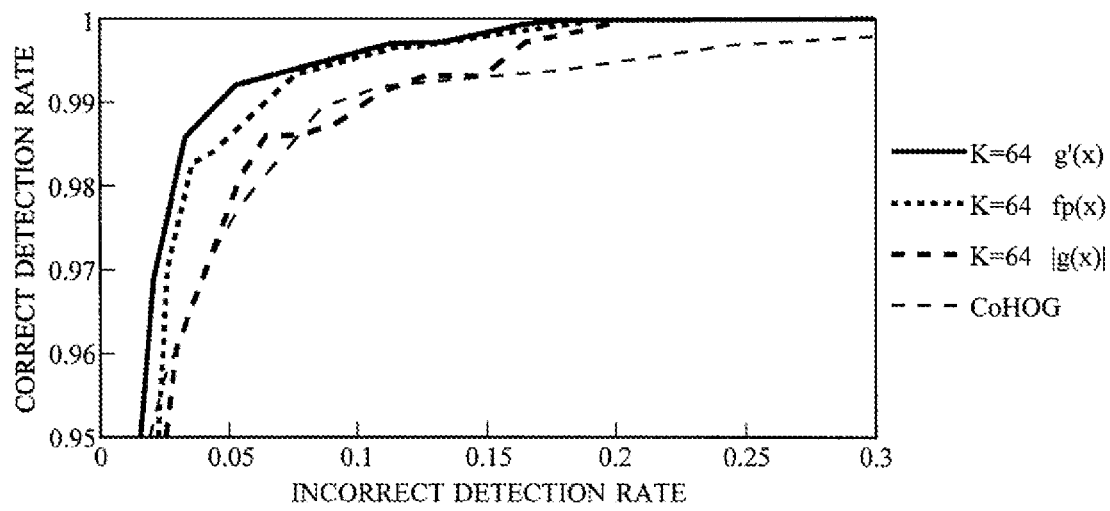

FIG. 6(b) shows a comparison between a case of using g'(x) (reference GMM), a case of using fp(x) (positive GMM) according to the pedestrian image, a case of using |g(x)| according to the difference, and a case of using CoHOG. The mixed number is set to K=64 in the method using these three GMMs.

As shown in the graphic chart, the accuracy is the highest in the case of g'(x), followed by the case of fp(x), the case of |g(x)|, and the case of using CoHOG.

In this way, when g'(x) to which the difference between fp(x) and fn(x) is learned is used, only the feature peculiar to the pedestrian can be detected and, the accuracy can be more improved than the case where fp(x) is solely used.

FIG. 7 is a flow chart for explaining a procedure of plot processing executed by the image processing device 8.

The following processing is executed by the CPU 81 in accordance with the image recognition program.

First, the image processing device 8 receives an input of an original image 2 which is an object for extracting a feature from the storage device 84 or the like, and reads it into the RAM 83 (Step 5).

Then, the image processing device 8 divides the original image 2 into block regions 3, and stores division positions thereof to the RAM 83 (Step 10).

Then, the image processing device 8 selects one of the divided block regions 3 of the high-resolution image 11 (Step 15), and generates pixels of the high-resolution image 11, pixels of the medium-resolution image 12, and pixels of the low-resolution image 13 for co-occurrence from the selected block region, and stores them in the RAM (Step 20).

It is to be noted that when using the original image 2 as it is as the high-resolution image 11, the pixels of the original image 2 are used as the pixels of the high-resolution image 11 without performing resolution conversion thereof.

Then, the image processing device 8 calculates gradient directions for the respective generated pixels of the high-resolution image 11, the medium-resolution image 12, and the low-resolution image 13, and stores them to the RAM 83 (Step 25).

Then, the image processing device 8 co-occurs in the gradient directions, in the high-resolution image 11, between the high-resolution image 11 and the medium-resolution image 12, and between the high-resolution image 11 and the low-resolution image 13, and plots it on the feature plane 15 to be stored in the RAM 83 (step 30). Consequently, the feature plane 15 in accordance with the aforementioned block region 3A are obtained.

Then, image processing device 8 determines whether all the pixels have already been plotted (Step 35).

If there is a pixel which has still not plotted (Step 35; N), the image processing device 8 returns to Step 20 to select the next pixel, and plots this selected pixel on the feature plane 15.

On the other hand, when all the pixels with regard to the aforementioned block region 3 have already been plotted (Step 35; Y), the image processing device 8 determines whether or not all the block regions 3 have already been plotted (Step 40).

If there is a block region 3 which has still not plotted (Step 40; N), the image processing device 8 returns to Step 15 to select the next block region 3, and plots this select block region 3 on the feature plane 15.

On the other hand, when all the block regions 3 have already been plotted (Step 40; Y), the image processing device 8 outputs to the RAM 83 the feature plane 15 generated for each offset pixel for every all block regions 3 from the array of the RAM 83 (Step 45).

FIG. 8 is a flow chart for explaining a procedure of learning processing executed by the image processing device 8.

First, the image processing device 8 reads a pedestrian image provided as a positive image from the storage device 84, to be stored in the RAM 83 (Step 50).

Then, the image processing device 8 plots the pedestrian image read into the RAM 83 as the original image 2, and generates the feature plane 15 for each block region 3 and for each offset pixel, to be stored in the RAM 83 (Step 55).

Then, the image processing device 8 determines whether or not the plot processing is applied to all the provided pedestrian images (Step 60), when there is still a pedestrian image to which the plot processing has not applied, (Step 60; N), the image processing device 8 returns to Step 50, and the plot processing is applied to the next pedestrian image.

On the other hand, when the plot processing is applied to all pedestrian images (Step 60; Y), the image processing device 8 reads all the feature planes 15 generated with respect to the pedestrian image from the RAM 83, and superimposes them on each corresponding feature plane 15 (i.e., each feature plane 15 generated with respect to the same offset pixel of the same block region 3) to be stored in the RAM 83 (Step 65).

Then, the image processing device 8 generates fp(x) (positive GMM) for each feature plane 15 of the superimposed pedestrian image by applying the EM algorithm, and stores the parameter in the RAM 83 (Step 70).

Then, the image processing device 8 reads a background image provided as a negative image from the storage device 84, to be stored in the RAM 83 (Step 75).

Then, the image processing device 8 plots the background image read into the RAM 83 as the original image 2, and generates the feature plane 15 for each block region 3 and for each offset pixel, to be stored in the RAM 83 (Step 80).

Then, the image processing device 8 determines whether or not the plot processing is applied to all the provided background images, when there is still a background image to which the plot processing has not applied, (Step 85; N), the image processing device 8 returns to Step 75, and the plot processing is applied to the next background image.

On the other hand, when the plot processing is applied to all background images (Step 85; Y), the image processing device 8 reads all the feature planes 15 generated with respect to the background image from the RAM 83, and superimposes them on every corresponding feature plane 15 to be stored in the RAM 83 (Step 90).

Then, the image processing device 8 generates fn(x) (negative GMM) for each feature plane 15 of the superimposed background image by applying the EM algorithm to be stored in the RAM 83 (Step 95).

The image processing device 8 prepares fp(x) and fn(x) for each feature plane 15 in this manner, and then generates the absolute value |g(x)| of the difference therebetween for each feature plane 15 to be stored in the RAM 83 (Step 100).

Furthermore, the image processing device 8 generates h(x) for each feature plane 15 from |g(x)| stored in the RAM 83, and generates the sample every feature plane 15 in accordance with h(x) by using the inverse function theorem, to be stored in the RAM 83 (Step 105).

Then, the image processing device 8 reads the designated mixed number K from the RAM 83, and generates the reference GMM (g'(x)) for each feature plane 15 from the sample in accordance therewith to be stored in the RAM (Step 110).

The reference GMM used for the image recognition is generated through the above-mentioned processing.

Figure 9:
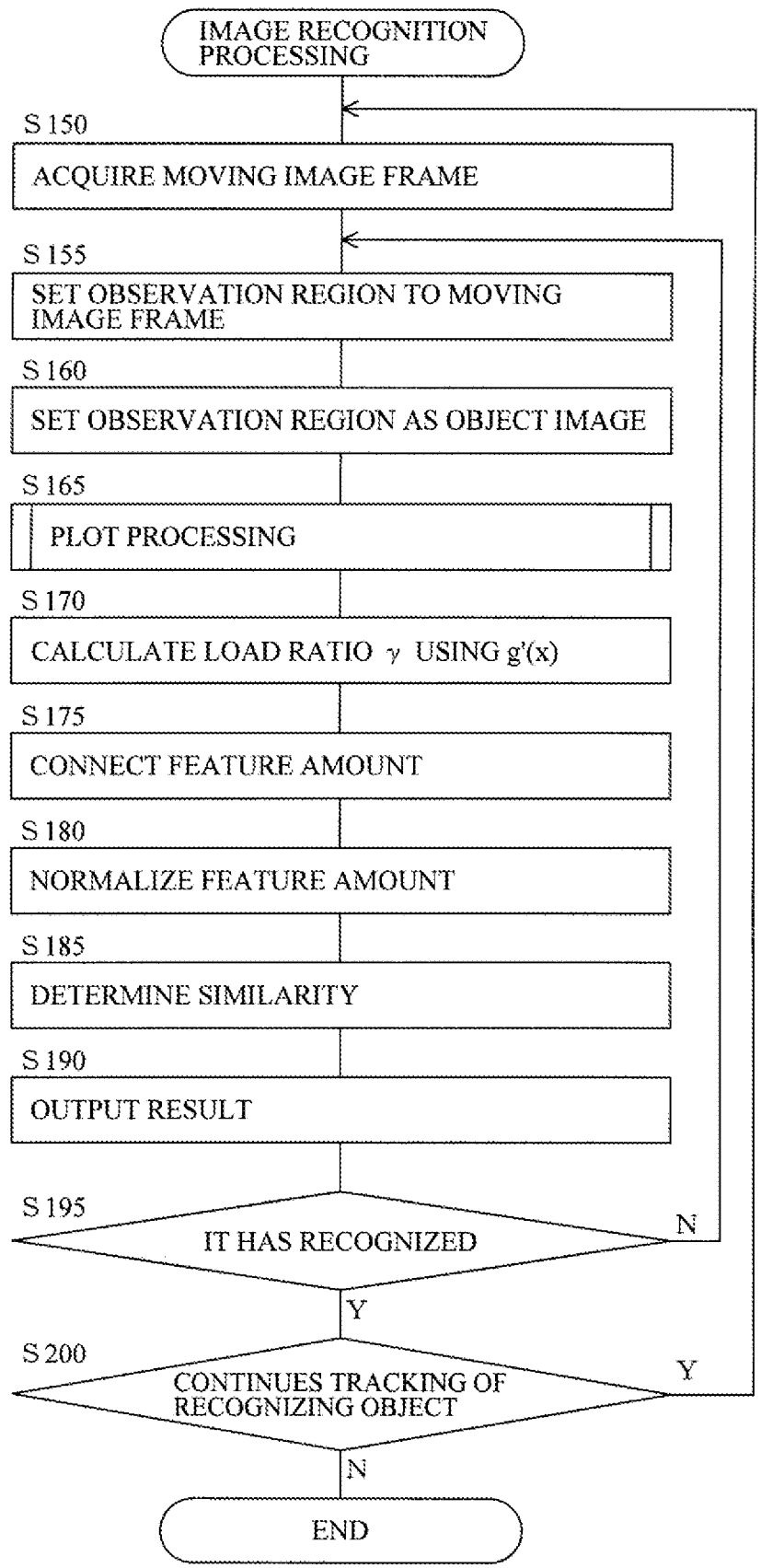
FIG. 9 is a flow chart for explaining a procedure of image recognition processing.

FIG. 9 is a flow chart for explaining a procedure of image recognition processing executed by the image processing device 8.

Here, a case of tracking a pedestrian by means of an in-vehicle camera will now be explained as an example.

The image processing device 8 is mounted in a vehicle, and is connected to the camera of which outside is a photographic object (forward direction of the vehicle, for example).

The vehicle tracks the pedestrian with the image processing device 8, and outputs this to a control system of the vehicle, and the control system assists a driver's handle operation, brake operation, and the like on the basis of this, and thereby safety is improved.

First, the image processing device acquires a moving image frame from the video (moving image) data transmitted from the camera, and stores it in the RAM 83 (Step 150).

Then, the image processing device 8 sets a rectangular observation region (image of interest region) for detecting the pedestrian, in the moving image frame stored in the RAM (Step 155).

In first-time pedestrian detection, since there it is not known where the pedestrian is shown, the image processing device 8 generates a random number (particles) with a white noise on the basis of the appropriate initial value, for example, and sets the observation region having an appropriate size at an appropriate position on the basis of this.

The image processing device 8 sets an image included in the aforementioned observation region as the image recognition object image to be stored in the RAM 83 (Step 160).

Then, the image processing device 8 applies plot processing to the object image as the original image 2, and extracts a feature amount according to the co-occurrence in the gradient directions from the object image to be stored in the RAM 83 (Step 165).

Then, the image processing device 8 reads a reference GMM from the RAM 83, and calculates a load ratio γ for each feature plane 15 of the object image using this reference GMM (Step 170).

Then, the image processing device 8 connects the load ratios γ calculated for every feature plane 15 with respect to all the feature planes 15, as a feature amount expressing the feature of the whole object image (Step 175), and normalizes this to be stored in the RAM 83 (Step 180).

Then, the image processing device 8 inputs the normalized aforementioned feature amount into the discriminator, and determines similarity on the basis of the value output therefrom (Step 185).

Subsequently, the image processing device 8 outputs the result to the RAM 83 (Step 190).

The image processing device 8 determines whether the pedestrian is recognized in the aforementioned observation region in the moving image frame on the basis of the analogical determination result (Step 195).

More specifically, when the analogical determination result is not similar, it is determined that the image processing device 8 has not recognized the pedestrian in the aforementioned observation region in the moving image frame (Step 195; N), and the image processing device 8 returns to Step 155, and also sets a observation region which is different from previous observation region in the moving image frame, and repeats the pedestrian's recognition.

On the other hand, when the analogical determination result is similar, the image processing device 8 determines that the pedestrian has recognized in the aforementioned observation region in the moving image frame (Step 195; Y), and outputs the recognized result to the control system of the vehicle.

Then, the image processing device 8 determines further whether it should continue the tracking of the recognizing object (Step 200). In this determination, for example, it is determined that tracking should not be continued when the vehicle stops traveling by arriving at a destination, etc., and it is determined that tracking should continue when the vehicle is traveling.

When it is determined that it does not continue the tracking (Step 200; N), the image processing device 8 completes the image recognition processing.

On the other hand, when it is determined that it should continue the tracking (Step 200; Y), the image processing device 8 returns to Step 150 to execute the similar image recognition processing with respect to the next moving image frame.

It is to be noted that in the second and subsequent image recognition, the image processing device 8 sets the observation region to the vicinity of the pedestrian being detected in the previous image recognition in Step 155.

This is because it is considered that the present moving image frame is present in the vicinity where the pedestrian is detected in the previous moving image frame.

It is effective for this to use a method of a particle filter for generating a random number (particles) which constitutes the normal distribution centering on the observation region where the pedestrian is previously detected, for example, generating an observation region one after another in correspondence with the aforementioned random number, and searching the observation region where the similarity is the highest.

As mentioned above, the image processing device 8 can detect the pedestrian from the image out of the vehicle captured by the in-vehicle camera and can track this pedestrian.

This method is applicable to a surveillance camera and a system for tracking another object which is moving on the basis of a moving image, in addition to the in-vehicle camera.

Although the recognizing object is the pedestrian as an example, it is also possible to apply to automatic driving for recognizing while traveling white lines on a road, traffic lights, road signs, and the like, for example.

It is also possible to track a vehicle which travels ahead in accordance with the image recognition, and to apply to so-called convoy traveling following this tracking.

In the embodiment described above, images of three resolutions for the same photographic object are prepared, and the co-occurrence in the gradient directions up to the offset distance 1 to 3 is acquired, but the present invention is not limited to this example. Images of two kind of resolutions or four or more kind of resolutions can be combined if the necessary image recognition accuracy can be obtained.

Furthermore, in the present embodiment, although the co-occurrence in the gradient directions is acquired over the plurality of resolutions in the high-resolution image 11, the medium-resolution image 12, and the low-resolution image 13, the co-occurrence may be taken in each resolution, such as taking the co-occurrence in the high-resolution image 11, taking the co-occurrence in the medium-resolution image 12, and taking the co-occurrence in the low-resolution image 13, so as to be plotted respectively on different feature planes 15.

Alternatively, as performed in the CoHOG, the co-occurrence can be taken in a single resolution, to generate the feature plane 15.

Modified Example

FIG. 10 are drawings for explaining a modified example 1.

According to the embodiment explained above, the reference GMM is generated using the absolute value |g(x)| of g(x).

Since the distribution according to fp(x) and the distribution according to fn(x) are mixed in |g(x)|, when generating the samples in accordance with h(x) obtained by normalizing this, the sample generated by a contribution of fp(x) and the sample generated by a contribution of fn(x) are mixed.

In this way, when clustering is executed in the state of both samples are mixed, the sample generated by a contribution of fp(x) and the sample generated by a contribution of fn(x) may be clustered in the same cluster.

Accordingly, in this modified example, the sample according to fp(x) and the sample according to fn(x) are divided respectively into the different clusters to generate the reference GMM.

The image processing device 8 in the modified example generates a difference g(x)=fp(x)−fn(x) between a positive GMM and a negative GMM, as shown in FIG. 10(a).

Then, as shown in FIG. 10(b), the image processing device 8 generates the sample using the portion of g(x)>0, and generates GMMp, setting the mixed number as K/2.

Furthermore, as shown in FIG. 10(c), after inverting the sign of the portion of g(x)<0, the image processing device 8 generates the sample using this, and generates GMMn, setting the mixed number as K/2.

Finally, as shown in FIG. 10(d), the image processing device 8 adds GMMp to GMMn to generate a reference GMM of which the mixed number is K.

Before generating the sample, the portion of g(x)>0 and the portion of g(x)<0 are normalized by being divided by $\int |g(x)| dx$, for example.

As mentioned above, the sample according to fp(x) and the sample according to fn(x) can be separately clustered, and thereby improvement in the accuracy can be expected.

Since a calculation amount of the modified example increases compared with that of the embodiment, the modified example 1 is suitable when there are sufficient resources of a computer and accuracy is required.

FIG. 11 are drawings for explaining a modified example 2.

In this modified example, metric processing of the correlation between fp(x) and fn(x) is performed using KL feature amount.

As shown in FIG. 11(a), the image processing device 8 calculates k(fp, fn) and k(fn, fp) using fp(x) and fn(x).

k(fp, fn) and k(fn, fp) are amounts called KL feature amount, and k(fp, fn) is expressed by the equation shown in FIG. 11(b). k(fn, fp) is an equation obtained by replacing fp and fn in this equation.

k(fp, fn) expresses a metric of the correlation with fn(x) viewed from fp(x), and k(fn, fp) expresses a metric of the correlation with fp(x) viewed from fn(x).

For example, even if an occurrence probability fp(x)−fn(x) is the same 0.1, the case of fp(x)−fn(x)=0.2−0.1=0.1 and the case of fp(x)−fn(x)=0.9−0.8=0.1 are different from each other when consideration of proportion. k(fp, fn) is an amount as a distance expressing how close fp(x) and fn(x) are, in also consideration of such proportion.

In the KL feature amount, fp(x) and fn(x) are defined in the form of log(fp(x)/fn(x)), and this is equivalent to log(fp(x))−log(fn(x)). Therefore, the KL feature amount is also a ratio between fp(x) and fn(x), and an amount which is also a difference therebetween is used.

Moreover, k(fp, fn) is weighted by fp(x) by multiplying fp(x) by the amount that is both of the ratio between fp(x) and fn(x) and the difference therebetween, and a portion where fp(x) is high is emphasized.

As mentioned above, the metric information expressed by the KL feature amount is a ratio probability density function using a ratio between the recognizing object probability density function and the non-recognizing object probability density function, and also uses the difference between the recognizing object probability density function and the non-recognizing object probability density function.

Then, as shown in FIG. 11(c), the image processing device 8 generates the sample by setting g(x)=k(fp, fn) for the region of fp(x)>fn(x) and g(x)=0 for other regions, to generate GMMp of which the mixed number is K/2.

Moreover, as shown in FIG. 11(d), the image processing device 8 generates the sample by setting g(x)=k(fn, fp) for the region of fn(x)>fp(x) and g(x)=0 for other regions, to generate GMMn of which the mixed number is K/2.

Then, the image processing device 8 generates a reference GMM in accordance with the reference GMM=GMMp+GMMn, as shown in FIG. 11(e).

Although this modified example defines the metric including both of the ratio and the difference therebetween using the logarithm, it is also possible to define a metric linearly or nonlinearly connecting the term of the ratio and the term of the difference, in addition to this example.

A third modified example will now be explained.

In this third modified example, a correlation between fp(x) and fn(x) is metricated using a JS feature amount.

In the JS feature amount, it is calculated with the following expression B using a(x) which is an average of fp(x) and fn(x) shown in the next expression A.

$$a(x)=(\tfrac{1}{2})fp(x)+(\tfrac{1}{2})fn(x) \qquad \text{Expression A:}$$

$$JS(fp,fn)=(\tfrac{1}{2})k(fp,a)+(\tfrac{1}{2})k(fn,a) \qquad \text{Expression B:}$$

In the expression B, the equation of k(fp, a) and k(fn, a) is the same as that of the equation of KL feature amount, and respectively expresses the metric of the correlation with a(x) viewed from fp(x) and the metric of the correlation with a(x) viewed from fn(x). These averages is the JS feature amount=JS(fp, fn).

Since the form of the expression is symmetric with respect to fp(x) and fn(x) (i.e., since the value of the equation does not change even fp(x) and fn(x) are interchanged with each other), JS(fp, fn) and JS(fn, fp) are equal to each other. In other words, in the metric using the JS feature amount, the metric of the correlation with fn(x) viewed from fp(x) and the metric of the correlation with fp(x) viewed from fn(x) are equal to each other.

On the other hand, in the KL feature amount, k(fp, fn) and k(fn, fp) are not generally equal to each other, and therefore the metric of the correlation with fn(x) viewed from fp(x) is different from the metric of the correlation with fp(x) viewed from fn(x).

As mentioned later, it was made clear by experiments performed by the present inventors that image recognition with high robustness can be performed for reducing the dimension of GMM by giving symmetry to the metric, in the JS feature amount.

As mentioned above, the metric information generating means generates the metric information in which the metric of the non-recognizing object probability density function with respect to the recognizing object probability density function and the metric of the recognizing object probability density function with respect to the non-recognizing object probability density function have symmetry.

FIG. 12 show graphic charts expressing result of a quantitative evaluation experiment in which an image recognition is executed using a JS feature amount.

Figure 12A:
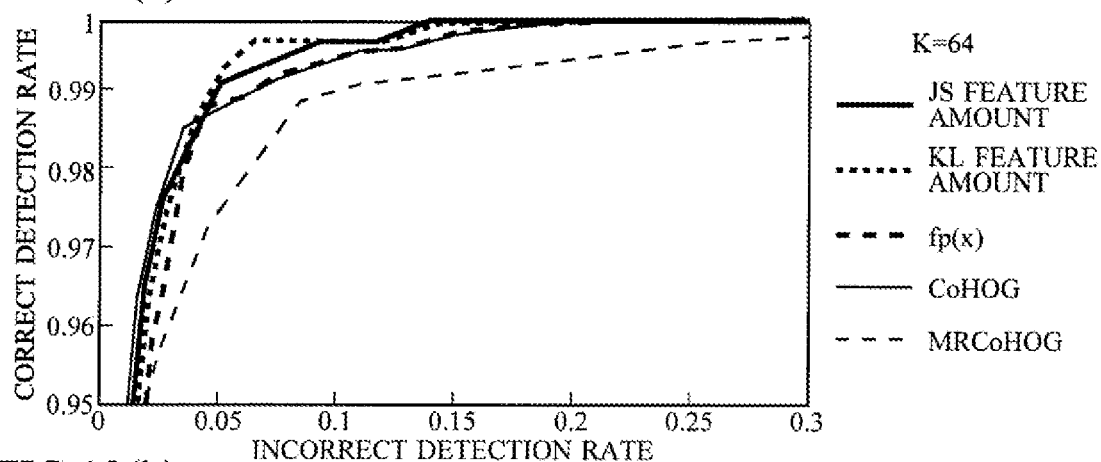
FIG. 12 show graphic charts expressing result of a quantitative evaluation experiment in which an image recognition is executed using a JS feature amount.
Figure 12B:
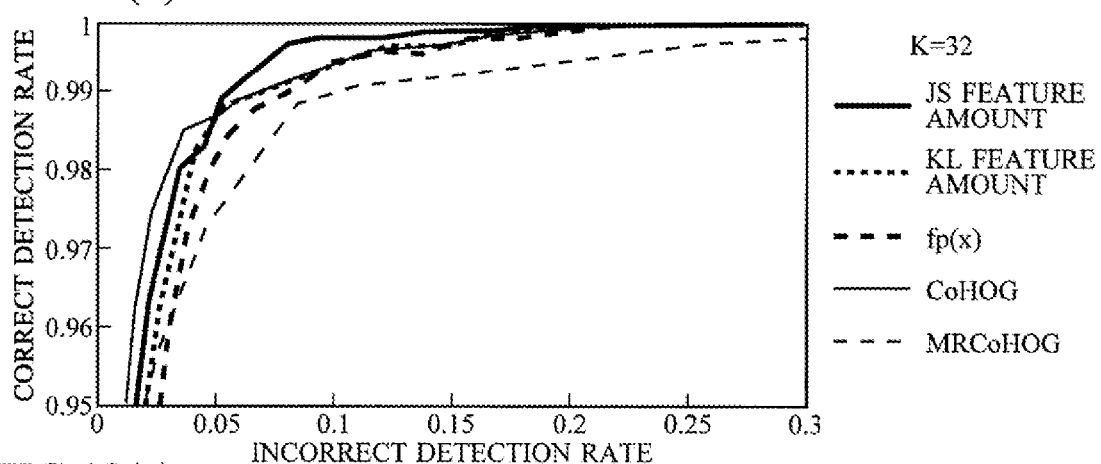
Figure 12C:
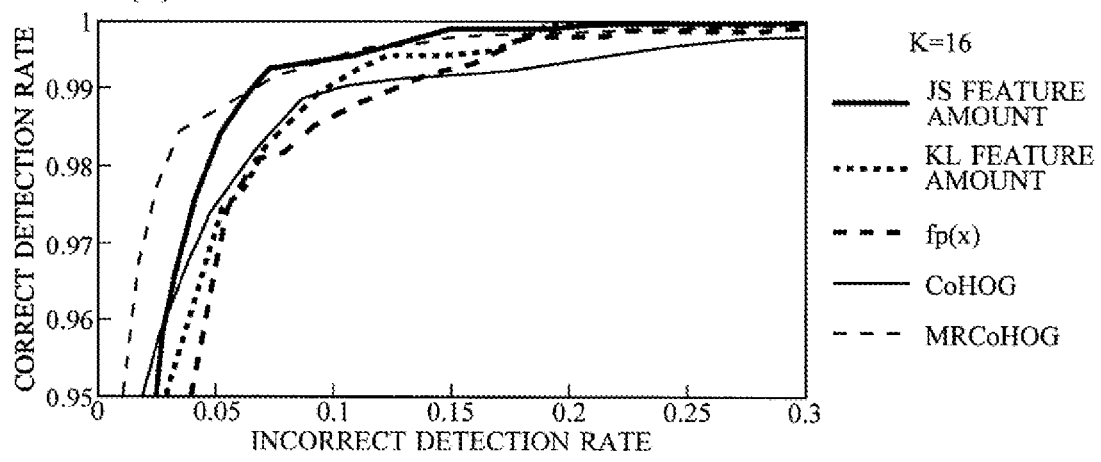

FIG. 12(a) shows a case of K=64 (where K is the mixed number of GMM), FIG. 12(b) shows the case of K=32, and FIG. 12(c) shows the case of K=16.

In these experiments, in addition to using the JS feature amount, using the KL feature amount, using only fp(x), using the CoHOG, using the MRCoHOG (obtained by improving the CoHOG) are also shown for comparison.

As shown in the graphic chart of FIG. 12(a), in the case of K=64, the method of using the JS feature amount (shown by the solid line of the thick line) exhibits image recognition ability of the same degree as the method of using the KL feature amount (shown by the wavy line of the thick line), and realizes accuracy higher than other methods.

As shown in the graphic chart of FIG. 12(b), if the mixed number is reduced by half from 64 to 32, the image recognition ability of almost other methods is reduced, there is almost no reduction in the method using the JS feature amount from the case of K=64.

As shown in the graph of FIG. 12(c), when the mixing number is further halved from 32 to 16, the method using the JS feature amount also reduces the image recognition ability, but the degree thereof is extremely small compared to the decrease of other method.

From the above-mentioned experiment, it is proved that the image recognition processing using the JS feature amount is more robust to reduction of the mixed number (reduction of the number of dimensions) than that of other methods.

When capturing a periphery of a vehicle by an in-vehicle camera and executing the image recognition of a pedestrian, it is preferable that the image processing device 8 mounted on the vehicle is as small as possible from a viewpoint of storage space and resistance to vibration. Also, a stand-alone device that is simpler than a system requiring large-scale image recognition processing by a server using network communications is preferable.

The image processing device 8 using the JS feature amount can reduce the mixed number of the GMM, and can be applied to a system that communicates with a server via a network, and can be used conveniently as a compact stand-alone on-vehicle image processing device 8.

According to the embodiment and the modified examples described above, the following effects can be obtained.
(1) Instead of the quantization in the gradient directions conventionally performed and the generation of the co-occurrence histogram according thereto, the co-occurrence in the gradient directions according to the continuous value can be mapped to the feature plane 15 to generate the GMM.
(2) In the prior art example, there are bins where not vote is given in the co-occurrence histogram created by the quantization, securing of the memory for the location and execution of calculation are required, and therefore the increase in calculation costs and reduction of detection accuracy may be caused. On the other hand, the image processing device 8 of the present embodiment can realize improvement in accuracy, preventing the increase in computational complexity, since the feature in particular important for expressing the detecting object may be preponderantly extracted with the parameter of GMM and may be calculated using this.

(3) By creating the distribution of again the co-occurrence on the basis of the difference between the feature amount of the pedestrian image (detection object image) and the feature amount of the background image (non-detection object image) at the time of learning of the co-occurrence distribution, the feature in particular more important for expressing the detection object can be acquired, and therefore the detection accuracy can be improved.

(4) By taking the difference between fp(x) and fn(x), the occurrence probability that fp(x) and fn(x) are invalid for identification can be it suppressed, and a probability density distribution in which the features with biased occurrence probability are easily to occur can be generated, and therefore relearning can be performed by applying the inverse function method thereto.

(5) Since the mixed number can be adjusted by relearning, as a result, the processing time and the detection accuracy can be freely adjusted in accordance with an application, an environment, computer resources, and the like.

(6) It is possible to avoid the influence of the setting of the bin width on the accuracy of machine learning and the discretization error accumulated near the bin boundary.

(7) In the modified examples 1 and 2, fp(x) and fn(x) can be separated from each other, from the result of the difference therebetween.

(8) In the modified example 3, by using the JS feature amount having the symmetry for the metric, even in a low GMM dimension, high image recognition can be realized. More specifically, the load of recognition processing can be reduced by decreasing the GMM dimension, and more high-speed recognition can also be realized.

EXPLANATION OF LETTERS OR NUMERALS

2 Original image
3 Block region
5 Pixel of interest
8 Image processing device
11 High-resolution image
12 Medium-resolution image
13 Low-resolution image
15 Feature plane
51 Co-occurrence corresponding point
53 GMM
55 Reference GMM
57 Distribution
60 Cluster
81 CPU
82 ROM
83 RAM
84 Storage device
85 Storage medium driving device
86 Input unit
87 Output unit

The invention claimed is:

1. An image processing device comprising:
at least one processor programmed to:
  input an image;
  acquire a combination of two pixels from the inputted image;
  acquire a co-occurrence in luminance gradient directions of the two pixels related to the acquired combination;
  acquire a distribution of an occurrence frequency of the co-occurrence that is acquired while changing the acquired combination of the two pixels;
  generate a probability density function (p(x1θ)) corresponding to the acquired distribution of the occurrence frequency, the probability density function (p(x1θ)) being a Gaussian Mixture Model (GMM), which is expressed by:

$$p(x1\theta) = \Sigma_{j=1}^{K} p(x|z=j,\theta) = \Sigma_{j=1}^{K} \pi_j N(x|\mu_j, \Sigma_j)$$

where K is a number of mixture coefficients, j=1, 2, ..., K, x is a vector quantity expressing a distribution of co-occurrence corresponding points, θ is a vector quantity expressing a population parameter, $\pi_j$ is a mixture coefficient indicating a probability for selecting a j-th Gaussian distribution, $\mu_j$ and $\Sigma_j$ respectively indicate an average value of j-th Gaussian distribution and a variance-covariance matrix, and z is a potential parameter for calculating an Expectation maximization (EM) and an algorithm and load ratio γ, and z1, z2, ..., zK are used in correspondence with the K Gaussian distributions to be mixed, the load ratio γ being a probability that a certain co-occurrence corresponding point of the distribution of co-occurrence corresponding points is generated from the j-th Gaussian distribution;

output the generated probability density function in accordance with a parameter that includes $\pi_j$ and θ to define the generated probability density function;
  input a plurality of recognizing object images including an inputted recognizing object;
  generate a positive Gaussian Mixture Model composed of a recognizing object probability density function fp(x) based on the plurality of recognizing object images;
  input a plurality of non-recognizing object images, which do not include the inputted recognizing object, and generate a negative Gaussian Mixture Model composed of a non-recognizing object probability density function fn(x) according to the plurality of non-recognizing object images;
  generate metric information to adopt a metric to a correlation between the generated recognizing object probability density function and the generated non-recognizing object probability density function;
  generate a Gaussian Mixture Model composed of a reference probability density function g'(x) based on the generated metric information, the generated reference probability density function being a reference for executing image recognition of the recognizing object using the generated recognizing object probability density function; and
  output the generated reference probability density function in accordance with the parameter for defining the generated reference probability density function.

2. The image processing device according to claim 1, wherein the at least one processor is programmed to generate the metric information in which the metric of the correlation with fn(x) viewed from fp(x) and the metric of the correlation with fp(x) viewed from fn(x) are equal to each other.

3. The image processing device according to claim 2, wherein the at least one processor is programed to:
generate a plurality of samples in accordance with the generated metric information, and generate the reference probability density function based on a distribution of an occurrence frequency of the generated sample.

4. The image processing device according to claim 3, wherein
the recognizing object probability density function and the non-recognizing object probability density function are generated respectively by mixing a predetermined number of basis functions, and
the at least one processor is programmed to mix a number of the basis functions that is smaller than the predetermined number to generate the reference probability density function.

5. The image processing device according to claim 2, wherein
the recognizing object probability density function and the non-recognizing object probability density function are generated respectively by mixing a predetermined number of basis functions, and
the at least one processor is programmed to mix a number of the basis functions that is smaller than the predetermined number to generate the reference probability density function.

6. The image processing device according to claim 1, wherein the at least one processor is programed to:
generate a plurality of samples in accordance with the generated metric information, and
generate the reference probability density function based on a distribution of an occurrence frequency of the generated sample.

7. The image processing device according to claim 6, wherein
the recognizing object probability density function and the non-recognizing object probability density function are generated respectively by mixing a predetermined number of basis functions, and
the at least one processor is programmed to mix a number of the basis functions that is smaller than the predetermined number to generate the reference probability density function.

8. The image processing device according to claim 1, wherein
the recognizing object probability density function and the non-recognizing object probability density function are generated respectively by mixing a predetermined number of basis functions, and
the at least one processor is programmed to mix a number of the basis functions that is smaller than the predetermined number to generate the reference probability density function.

9. The image processing device according to claim 1, wherein the at least one processor is programmed to:
convert a resolution of the input image, and
set a pixel of the image with the converted resolution to be an object of the combination.

10. The image processing device according to claim 1, wherein the metric information is a differential probability density function using a difference between the recognizing object probability density function and the non-recognizing object probability density function.

11. The image processing device according to claim 1, wherein the metric information is a ratio probability density function using a ratio between the recognizing object probability density function and the non-recognizing object probability density function.

12. The image processing device according to claim 11, wherein the ratio probability density function further uses a difference between the recognizing object probability density function and the non-recognizing object probability density function.

13. An image recognition device comprising:
a computer programmed to:
acquire the reference probability density function output from the image processing device according to claim 1;
acquire an object image which is an image recognition object;
acquire a feature amount of the acquired object image using the acquired reference probability density function; and
determine whether the object image includes the image recognition object using the acquired feature amount.

14. The image recognition device according to claim 13, wherein the computer is programmed to:
acquire a distribution of an occurrence frequency of co-occurrence in gradient directions in the object image, and
acquire the feature amount of the object image based on a probability that the acquired distribution of the occurrence frequency is generated from the acquired reference probability density function.

15. A non-transitory computer readable storage medium storing computer-executable instructions of an image recognition program that, when executed by a computer, causes the computer to perform processes comprising:
acquiring the reference probability density function output from the image processing device according to claim 1;
acquiring an object image which is an image recognition object;
acquiring a feature amount of the acquired object image using the acquired reference probability density function; and
determining whether the object image includes the image recognition object using the acquired feature amount.

16. A non-transitory computer readable storage medium storing computer-executable instructions of an image processing program that, when executed by a computer, causes the computer to perform processes comprising:
inputting an image;
acquiring a combination of two pixels from the inputted image;
acquiring a co-occurrence in luminance gradient directions of the two pixels related to the acquired combination;
acquiring a distribution of an occurrence frequency of the co-occurrence that is acquired while changing the acquired combination of the two pixels;
generating a probability density function ($p(x|\theta)$) corresponding to the acquired distribution of the occurrence frequency, the probability density function ($p(x|\theta)$) being a Gaussian Mixture Model (GMM), which is expressed by:

$$p(x|\theta)=\Sigma^{K}_{j=1}p(x|z=j,\theta)=\Sigma^{K}_{j=1}\pi_{j}N(x|\mu_{j},\Sigma_{j})$$

where K is a number of mixture coefficients, $j=1, 2, \ldots, K$, x is a vector quantity expressing a distribution of co-occurrence corresponding points, $\theta$ is a vector quantity expressing a population parameter, $\pi_j$ is a mixture coefficient indicating a probability for selecting a j-th Gaussian distribution, $\mu_j$ and $\Sigma_j$ respectively indicate an average value of j-th Gaussian distribution and a variance-covariance matrix, and z is a potential parameter for calculating an Expectation maximization (EM) and an algorithm and load ratio γ, and z1, z2, ..., zK are used in correspondence with the K Gaussian distributions to be mixed, the load ratio γ being a probability that a certain co-occurrence corresponding point of the distribution of co-occurrence corresponding points is generated from the j-th Gaussian distribution;

outputting the generated probability density function in accordance with a parameter that includes $\pi_j$ and θ to define the generated probability density function;

inputting a plurality of recognizing object images including an inputted recognizing object;

generating a positive Gaussian Mixture Model composed of a recognizing object probability density function fp(x) based on the plurality of recognizing object images;

inputting a plurality of non-recognizing object images, which do not include the inputted recognizing object, and generating a negative Gaussian Mixture Model composed of a non-recognizing object probability density function fn(x) according to the plurality of non-recognizing object images;

generating metric information to adopt a metric to a correlation between the generated recognizing object probability density function and the generated non-recognizing object probability density function;

generating a Gaussian Mixture Model composed of a reference probability density function g'(x) based on the generated metric information, the generated reference probability density function being a reference for executing image recognition of the recognizing object using the generated recognizing object probability density function; and outputting the generated reference probability density function in accordance with the parameter for defining the generated reference probability density function.

\* \* \* \* \*